(12) United States Patent
Shoji

(10) Patent No.: US 8,149,758 B2
(45) Date of Patent: Apr. 3, 2012

(54) WIRELESS COMMUNICATION SYSTEM

(75) Inventor: Yozo Shoji, Tokyo (JP)

(73) Assignee: National Institute of Information and Comunications Technology, Tokyo (JP)

( * ) Notice: Subject to any disclaimer, the term of this patent is extended or adjusted under 35 U.S.C. 154(b) by 424 days.

(21) Appl. No.: 11/989,765

(22) PCT Filed: Aug. 3, 2006

(86) PCT No.: PCT/JP2006/315432
§ 371 (c)(1),
(2), (4) Date: May 4, 2010

(87) PCT Pub. No.: WO2007/015552
PCT Pub. Date: Feb. 8, 2007

(65) Prior Publication Data
US 2010/0226304 A1    Sep. 9, 2010

(30) Foreign Application Priority Data
Aug. 3, 2005  (JP) ................. 2005-014214

(51) Int. Cl.
*H04J 1/08* (2006.01)
(52) U.S. Cl. ......... 370/315; 370/329; 370/338; 370/392
(58) Field of Classification Search .......... 370/315, 370/329, 338
See application file for complete search history.

(56) References Cited

U.S. PATENT DOCUMENTS

| | | | | |
|---|---|---|---|---|
| 5,010,583 | A * | 4/1991 | Parken | 455/9 |
| 6,005,853 | A * | 12/1999 | Wang et al. | 370/332 |
| 7,257,383 | B2 * | 8/2007 | Young et al. | 455/138 |
| 2002/0128009 | A1 * | 9/2002 | Boch et al. | 455/426 |
| 2003/0124994 | A1 * | 7/2003 | Ylitalo | 455/91 |
| 2007/0086484 | A1 * | 4/2007 | Quigley et al. | 370/468 |

FOREIGN PATENT DOCUMENTS

| | | |
|---|---|---|
| JP | 9 284835 | 10/1997 |
| JP | 2002 33694 | 1/2002 |
| JP | 2004312150 | 11/2004 |
| JP | 2005 94263 | 4/2005 |

* cited by examiner

Primary Examiner — Dang Ton
Assistant Examiner — Pamit Kaur
(74) Attorney, Agent, or Firm — Jacobson Holman PLLC

(57) ABSTRACT

Disclosed is a wireless communication method for executing transmission and reception of a radio signal among communication terminals via a plurality of base stations connected to an IP (Internet Protocol) network. One of the base stations performs AD conversion on a radio signal received via an antenna from one of the communication terminals without demodulation, packetizes the AD-converted radio signal into packet data, and transmits the packet data to another base station over the IP network. The another base station performs DA conversion on the packet data received over the IP network from the one base station, transforms the DA-converted packet data into a radio signal without modulation, and transmits the radio signal to another base station via the antenna.

10 Claims, 15 Drawing Sheets

FIG. 8
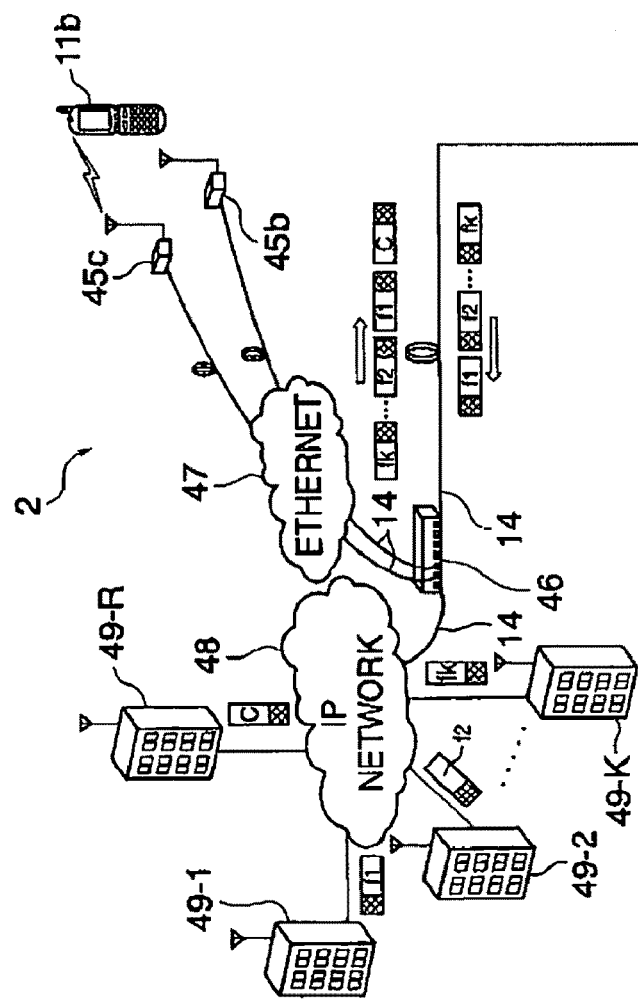
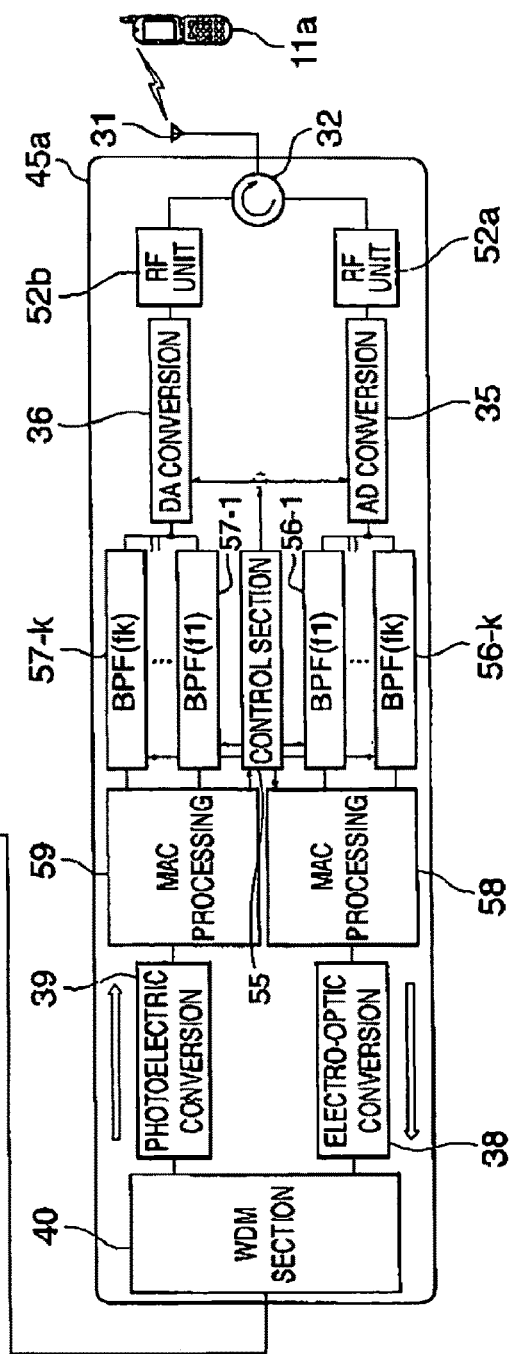

WIRELESS COMMUNICATION SYSTEM

This is a national stage of PCT/JP06/315432 filed Aug. 3, 2006 and published in Japanese.

TECHNICAL FIELD

The present invention relates to a wireless communication system and method of executing transmission and reception of radio signals among communication terminals via a plurality of base stations connected to an IP network.

BACKGROUND ART

Recently, a wireless transmission system and a wireless access system which employ the ROF (Radio over Fiber) technology to accommodate radio base stations for mobile communication, typified by cellular phones, in a control station using optical fibers is drawing attention. According to the ROF technology, radio signals are optically transmitted through optical fibers to permit modems, controllers, etc. to be collectively accommodated in a control station, thereby simplifying the configuration of the radio base stations to make the radio base stations compact. This can allow multiple radio base stations to be disposed along roads and in underground mall, tunnels and so forth.

FIG. 1 shows an example of the configuration of a wireless transmission system 8 employing the ROF technology. This wireless transmission system 8 has a communication terminal 181, a plurality of base stations 182a, 182b for relaying communication data for transmission and reception of radio signals to and from the communication terminal 181, and a host control unit 183 which controls the general communications over an optical fiber communication network 184 including the connected base stations 182.

The communication terminal 181 is configured to be able to be mounted on a vehicle or portable so that radio signals are to be exchanged with the base stations 182 provided in individual zones. That is, the communication terminal 181 includes a device which is installed in, for example, a personal computer or the like to execute data communication, but is generally a cellular phone or the like which enables voice communication. Particularly, the communication terminal 181 is configured as a small-sized and lighter device designed for portability.

As shown in FIG. 2, implemented in each base station 182 are an antenna 101 for transmission and reception of radio signals to and from the communication terminal 181, an antenna sharing unit 102 connected to the antenna 101, an electro-optic conversion section 103 and a photoelectric conversion section 104 both connected to the antenna sharing unit 102, and a WDM multiplexer (demultiplexer) 105.

When receiving a radio signal from the communication terminal 181 via the antenna 101, the base station 182a transmits the radio signal to the electro-optic conversion section 103 via the connected antenna sharing unit 102 where the radio signal is converted to an optical signal. Next, the generated optical signal is WDM multiplexed with the received optical signal and the resultant optical signal is optically coupled into a single optical fiber to be transmitted to the optical fiber communication network 184. At this time, the base station 182 performs analog modulation on an optical carrier which remains as a burst wave having the same waveform as the radio signal as shown in FIG. 1, regardless of the radio format, and transmits the optical signal to the optical fiber communication network 184. With regard to the optical analog modulation, generally, analog modulation or intensity modulation is often executed while optical SSB modulation, optical FM modulation or optical coherent modulation (PM modulation) may be carried out to overcome various problems.

The optical signal transmitted to the optical fiber communication network 184 from the base station 182a is subjected to modulation/demodulation process under the control of the host control unit 183, and is then transmitted to another backbone network 190 or another base station 182b. In the base station 182b, the optical signal received over the optical fiber communication network 184 is demultiplexed by the WDM multiplexer (demultiplexer) 105, the demultiplexed signal is converted to an electrical signal by the photoelectric conversion section 104, and the electrical signal is then transmitted as a radio signal to the communication terminal 181 via the antenna sharing unit 102 and the antenna 101.

In other words, the wireless transmission system using the ROF technology does not need to execute modulation/demodulation of a radio signal at a base station. This makes it unnecessary to change the system configuration of a base station even if the services and the specifications are changed, so that the flexibility of the whole system can be improved.

The ROF is used as means for constructing a low-cost remote antenna which is provided as a countermeasure for dead zones where radio waves, such as broadcast waves, do not reach, and is particularly suitable when constructing a low-cost system under a picocell environment. Particularly, the ROF can permit a variety of radio formats to be handled by the same base station device in a unitary manner and it is attracting attention as a technology that can flexibly and quickly cope with a future change in radio format.

Conventionally, a technique disclosed in, for example, Japanese Unexamined Patent Publication No. 2005-175675 is proposed as a radio transmission station using the ROF technology. According to the disclosed technique, the sender's portable communication device expands the bandwidth of radio transmission signals according to the bandpass characteristic which is opposite to the bandwidth limiting characteristic of a bandwidth limiting filter provided in a receiver's portable communication device, and transmits the bandwidth-expanded radio transmission signals to an optical transmission path. This can effectively attenuate the spurious that occurs in an optical transmission zone without degrading the characteristic of a desired signal.

The radio transmission station using the ROF technology is also adapted to, for example, a communication system between a road and a vehicle (see, for example, Japanese Unexamined Patent Publication No. 2002-33694). The road-vehicle communication system constructs a network with base stations disposed along a road, antenna sections of the base stations, a control section which controls the base stations, and cables which connect those components. Radio transmission between a mobile terminal, mounted on a vehicle, and a base station is carried out based on the code division multiplex transmission system, and the control section collectively controls individual processes, such as communication modulation and demodulation processing, multiple access processing, frequency assignment and code assignment. This can minimize complex control accompanying the movement of a mobile body like a vehicle.

In the wireless transmission system 8 using the ROF technology, it is ideal that the optical fiber communication network 184 can be constructed by an IP (Internet Protocol)-based existing optical network, not an exclusive analog optical link transmission path. The IP network is a connectionless network which executes packet transfer determined by the IP. In the IP network, an address indicative of the transmission destination is inserted in the header of each packet as divided transmission data, and a router 186 transfers the packet to the transmission destination based on the address.

At this time, the router 186 identifies the IP address and MAC (Media Access Control) address located in the header of the packet transmitted over the IP network, and a tag or label also added to the header, and sends the packet to a transmission path to the destination according to a routing table implemented in the router 186. As an example of the router, a low-cost L2/L3 switch has been frequently used in place of the conventional legacy router. The IP network is constructed by arranging access nodes in a mesh pattern using the L2/L3 switches. It is expected that a packet-exchange type mesh network constructed by similar L2/L3 switches will be the mainstream in a wider trunk network.

Even in a somewhat wide trunk network, a low-cost mesh network can be constructed by replacing existing routers with L2/L3 switches if data formats to be handled can be limited to an IP packet and a frame based on the standardized Ethernet (registered trademark) protocol.

By way of contrast, in recent years, particularly, a so-called VPN (Virtual Private Network) is becoming popular, in which end-to-end communication or subnet-to-subnet communication is virtually considered as one LAN (Local Area Network) separated from other communication networks. In the VPN, a private network is constructed on a shared network, and data to be exchanged with a communication party is encrypted to prevent a third party from seeing the communication contents.

To efficiently exchange packets in the IP network and transmit them to a communication party in the VPN, the MPLS (Multi-Protocol Label Switching) technique, tag VLAN (Virtual LAN), etc. are proposed as a label switching technique, for example. This tag VLAN constructs a virtual network group by combining arbitrary terminals without depending on the apparent connection mode in networks including wireless LAN/cable LAN.

The wireless transmission system using the ROF technology generally uses an analog modulation system for optical modulation. When intensity modulation is used in the optical modulation, particularly, the modulation is likely to be affected by the non-linearity of optical devices used in transmission systems, such as the electro-optic conversion section 103 and photoelectric conversion section 104 in FIG. 2. When information is transmitted by the ROF, therefore, optical devices and optical transmission devices which are used in the ordinary fast optical digital communication cannot be adopted directly, and high-performance optical devices which do not have non-linearity, and an advanced non-linear correcting technique are needed for the ROF, which leads to a significant increase in the cost of the overall system.

In particular, the recent popularity and progress of FTTH (Fiber To The Home) allow optical fiber networks to be constructed at ends of offices as well as at individual homes. However, such an optical fiber network is an optical fiber access circuit designed for cost reduction and optimization as an IP network to provide a broadband circuit, and makes it difficult to use transmitters/receivers, exchangers, etc. to be used therein as a wireless transmission system using the ROF technology.

In the conventional ROF, the signal format in an optical fiber was an analog modulation system, and suffered poor compatibility with a digital optical transmission device which became popular according to the global use of the FTTH and optical Ethernet (registered trademark) network even if real data to be transmitted was IP packet data. In the case of executing the ROF-based communication, therefore, conventionally, the control station should always execute demodulation to enable packet exchange.

Conventionally, when one wants to construct a virtual private network suitable for wireless access, i.e., when signals are exchanged between wireless communication terminals belonging to radio access zones which are controlled by different base stations or the control station, signals received from one communication terminal needs to be demodulated once by the base station or the control station or the like. An IP packet demodulated by the base station or the like transmitted to the desired base station or the control station over the IP network and is then modulated to be transformed into a radio signal, which is in turn transmitted to a radio zone via an antenna. Accordingly, the modulation and demodulation processes that are executed by a base station and the control station become redundant, and wasteful traffic in the IP network increases, eventually increasing the total amount of traffic.

Further, while a one-segment broadcasting service of the terrestrial digital broadcasting targeted for reception by mobile terminals is becoming popular, radio wave dead zones exist not only within a building, a train station and the like, but also some locations outdoor. To eliminate such radio wave dead zones, the use of a system of re-relaying broadcast waves via a gap-filler system indoor and outdoor is in process. While studies are made to use the ROF as the gap-filler system, such approach requires new devices and organization of the infrastructure, which would lead to consumption of a substantial time and cost.

DISCLOSURE OF THE INVENTION

In consideration of the foregoing conventional situations, it is an object of the present invention to provide a wireless communication system and method capable of eliminating redundant modulation and demodulation executed in the system at the time of transmission and reception of radio signals among communication terminals via a plurality of base stations connected to an IP network, thereby achieving efficient transmission and significantly reducing the cost.

To achieve the object, according to the invention, there is provided a wireless communication system for executing transmission and reception of a radio signal among communication terminals via a plurality of base stations connected to a cable network, wherein one of the base stations performs AD conversion on a radio signal received via an antenna from one of the communication terminals without demodulation, packetizes the AD-converted radio signal into packet data, and transmits the packet data to another base station over the cable network, and the another base station performs DA conversion on the packet data received over the cable network from the one base station, transforms the DA-converted packet data into a radio signal without modulation, and transmits the radio signal to another communication terminal via the antenna.

To achieve the object, according to the invention, there is provided a wireless communication system for executing transmission and reception of a radio signal among communication terminals via a base station connected to a cable network, wherein the base station performs AD conversion on a radio signal received via an antenna from one of the communication terminals without demodulation, packetizes the AD-converted radio signal into packet data, and transmits the packet data to a control station over the cable network, and the control station transmits data obtained through DA conversion and demodulation of the packet data received over the cable network from the base station, or data obtained performing a MAC on the packet data to another communication terminal over an IP (Internet Protocol) network.

To achieve the object, according to the invention, there is provided a wireless communication system for executing transmission and reception of a radio signal among communication terminals via a plurality of base stations connected to a cable network, wherein one of the communication terminals on an IP (Internet Protocol) network modulates, beforehand, data to be transmitted to another communication terminal addressed, performs AD conversion on the data, then packetizes the AD-converted data into packet data, and transmits the packet data to the plurality of base stations over the cable network, and the plurality of base stations perform DA conversion on the packet data received over the cable network from the one communication terminal, transforms the DA-converted packet data into a radio signal without modulation, and transmits the radio signal to another communication terminal via an antenna.

To achieve the object, according to the invention, there is provided a wireless communication system comprising a radio transmission station that transmits a radio signal; a packet converting unit that performs AD conversion on the radio signal from the radio transmission station via an antenna without demodulation, packetizes the AD-converted radio signal into packet data, and transmits the packet data; a cable network that transmits at least the packet data transmitted from the packet converting unit; and a terminal unit having demodulation means for demodulating the packet data transmitted over the cable network connected to the terminal unit.

To achieve the object, according to the invention, there is provided a wireless communication system comprising a radio transmission station that transmits a radio signal; a packet converting unit that performs AD conversion on the radio signal received from the radio transmission station via an antenna without demodulation, packetizes the AD-converted radio signal into packet data, and transmits the packet data to a cable network; and a base station that performs DA conversion on the packet data transmitted from the packet converting unit over the cable network connected to the base station, transforms the DA-converted packet data into a radio signal without modulation, and transmits the radio signal to a communication terminal via an antenna.

To achieve the object, according to the invention, there is provided a wireless communication method for executing transmission and reception of a radio signal among communication terminals via a plurality of base stations connected to a cable network, wherein one of the base stations performs AD conversion on a radio signal received via an antenna from one of the communication terminals without demodulation, packetizes the AD-converted radio signal into packet data, and transmits the packet data to another base station over the cable network, and the another base station performs DA conversion on the packet data received over the cable network from the one base station, transforms the DA-converted packet data into a radio signal without modulation, and transmits the radio signal to another communication terminal via the antenna.

To achieve the object, according to the invention, there is provided a wireless communication method comprising transmitting a radio signal from a radio broadcast station; receiving the transmitted radio signal at a packet converting unit via an antenna; performing AD conversion on the received radio signal without demodulation; packetizing the AD-converted radio signal into packet data, and transmitting the packet data; transmitting at least the packet data transmitted from the packet converting unit over a cable network; and demodulating the transmitted packet data with demodulation means in a terminal device connected to the cable network.

BRIEF DESCRIPTION OF THE DRAWINGS

FIG. 8 is a diagram for explaining an example of controlling communications among communication terminals in such a way that the communications are carried out in shortest paths to each other;

BEST MODE FOR CARRYING OUT THE INVENTION

Figure 1:
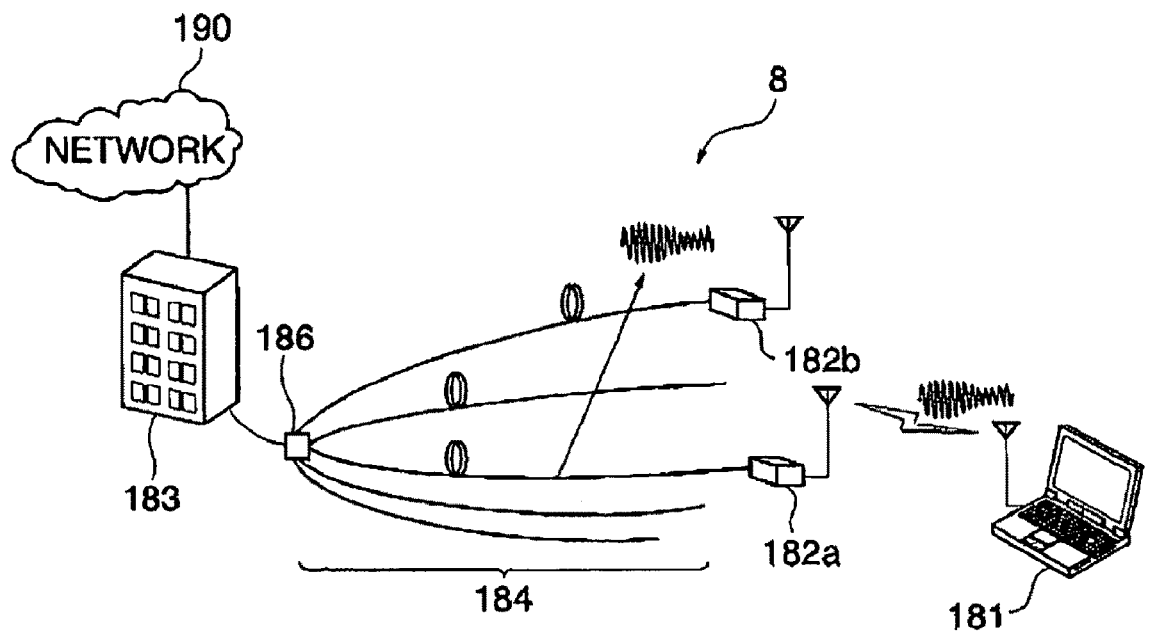
FIG. 1 is a diagram showing an example of the configuration of a wireless transmission system using the ROF technology.
Figure 2:
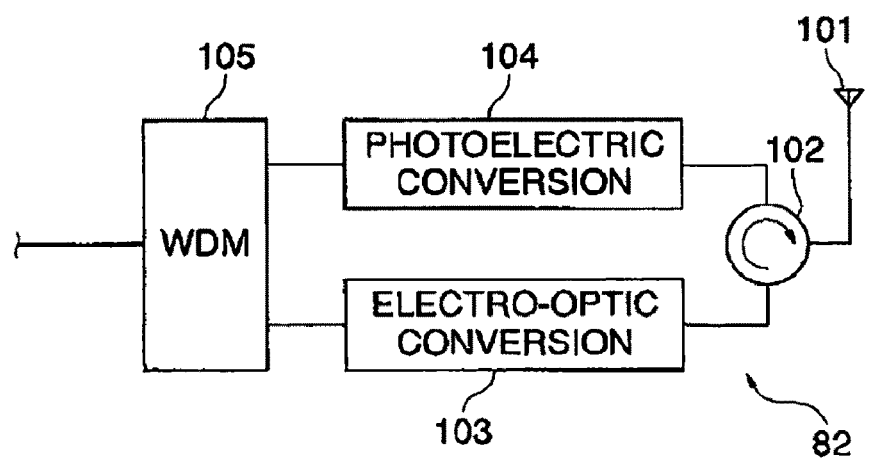
FIG. 2 is a diagram showing the general block configuration of a base station.
Figure 3:
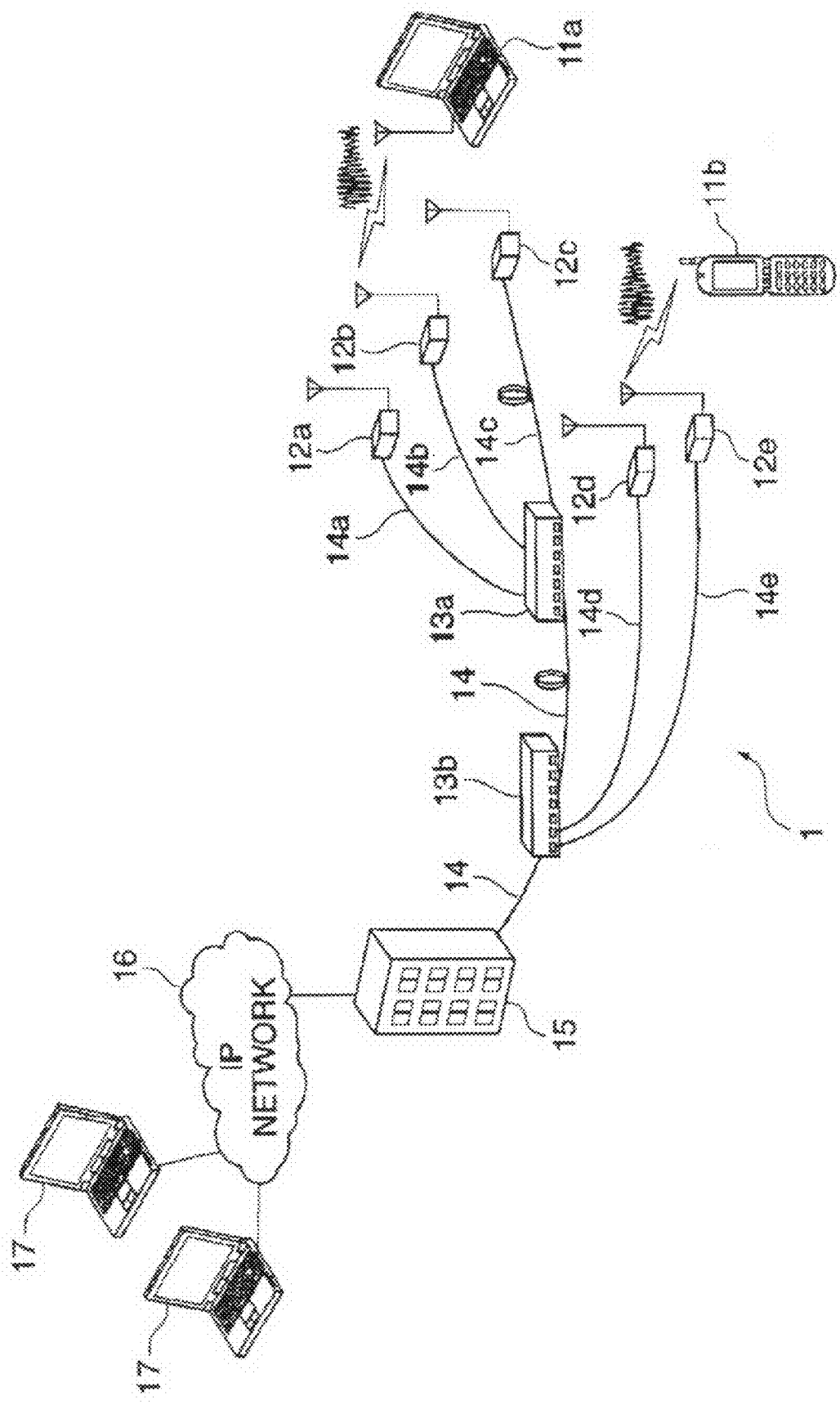
FIG. 3 is a structural diagram of a wireless transmission system to which the present invention is adapted.

The best mode of carrying out the present invention as adapted to a wireless communication system 1 shown in FIG. 3 will be described below by way of example.

The wireless communication system 1 to which the present invention is adapted is a system which has a flexible exchange capability within a radio signal cable network in addition to the effects of the wireless transmission system using the so-called ROF (Radio over Fiber) technology. The wireless communication system 1 includes communication terminals 11a, 11b as mobile terminals which a pedestrian can carry around, a plurality of base stations 12a, 12b, 12c, 12d, 12e for relaying communication by transmission and reception of radio signals to and from the communication terminal 11, an optical switch 13a to which optical fibers 14a, 14b, 14c respectively connected to the base stations 12a, 12b, 12c is to be coupled, an optical switch 13b to which optical fibers 14d, 14e respectively connected to the base stations 12d, 12e is to be coupled, a control station 15 connected to the optical switch 13a, and an IP (Internet Protocol) network 16 connected to the control station 15. FIG. 3 shows one example of the connection mode between the base station 12 and the optical fiber 14 in the wireless communication system 1, and is not restrictive. The optical fiber 14 may be replaced with an electric wire (not shown) which transmits and receives an electrical signal. In this case, all the steps of photoelectric conversion and electro-optic conversion to be described later are omitted.

The communication terminal 11 is so configured as to be mountable on a vehicle or portable to enable transmission and reception of radio signals to and from the base stations 12a, 12b, 12c, 12d and 12e provided in individual areas. That is, the communication terminal 11 includes a device which is installed in, for example, a personal computer or the like to execute data communication, but is generally a cellular phone or the like which enables voice communication, and is particularly configured as a small-sized and lighter device designed for portability.

Each base station 12 performs AD (Analog-Digital) conversion on a radio signal received from the communication terminal 11 without demodulation to generate a digital signal. The base station 12 packetizes the generated digital signal into packet data, and further performs electro-optic conversion on the packet data to generate an optical signal. The base station 12 multiplexes the generated optical signals and transmits the multiplexed signal via the optical fiber 14.

The base station 12 demultiplexes the optical signal transmitted via the optical fiber 14 connected thereto, and performs photoelectric conversion on the demultiplexed signals to generate a packet data sequence of electrical signals. The base station 12 performs DA (Digital-Analog) conversion on a real data portion in the generated packet data sequence to generate an analog signal, and transforms the analog signal into a radio signal to be transmitted to the communication terminal 11.

The optical switch 13 is, for example, an IP router, an L2/L3 switch, an ATM switch or the like which conforms to a so-called Ether switch according to the standards of the Ethernet (registered trademark) protocol. The optical switch 13, which may be an inexpensive switch to be used in a small-scale LAN, has a plurality of ports to connect to the optical fibers 14. In the example shown in FIG. 3, the optical switch 13a and the optical switch 13b are connected by an optical fiber, a network connected by the optical switches 13a and 13b is used as the Ethernet (registered trademark). The network connected by the optical switches 13a and 13b may be constructed by an IP network or an ATM network as well as the Ethernet (registered trademark).

The control station 15 performs the general control processes and modulation and demodulation processes which are needed in the wireless communication system 1, and performs a MAC process to bridge a demodulated digital signal to an IP network as needed. For example, the control station 15 demultiplexes an optical signal transmitted from the optical switch 13b, and performs photoelectric conversion on the demultiplexed signal to generate an electrical packet data sequence. The control station 15 further performs a MAC process on the generated electrical signal to extract a real data portion, performs DA conversion thereon to generate an analog signal, and demodulates the analog signal using a demodulator to demodulate information data. Further, to transmit the data to the IP network 16 as needed, the control station 15 performs an adequate MAC process on the data before transmission.

The IP network 16 is a connectionless network which executes packet transfer determined by the IP. The IP network 16 is connected with terminal devices 17. For example, an IP phone, a personal computer (PC), a television receiver and the like are available as the terminal devices 17, which are not limited thereto. The terminal devices 17 may be connected to the IP network 16 over an unillustrated LAN (Local Area Network). In the present invention, the IP network 16 may be replaced with any cable network.

Next, the detailed configuration of the communication terminal 11 as used as a cellular phone will be described by way of example.

Figure 4:
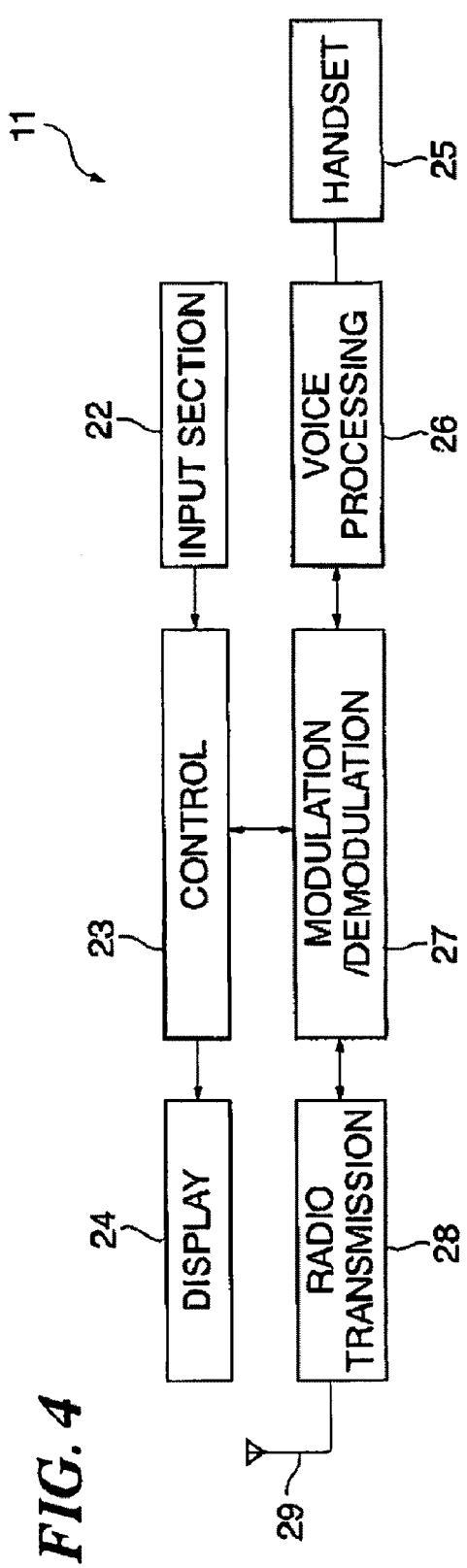
FIG. 4 is a diagram showing the block configuration of a communication terminal.

For example, as shown in FIG. 4, the communication terminal 11 includes an input section 22, a control section 23 connected thereto, a display section 24 and a modulation/demodulation section 27 both connected to the control section 23, a radio transmission section 28 and an antenna 29, the latter two being sequentially connected to the modulation/demodulation section 27. The modulation/demodulation section 27 is further connected with a voice processing section 26 to which a handset section 25 is connected.

The input section 22 has a plurality of keys, such as numerical keys and operational keys, provided on one major surface of a casing. When a key provided at the input section 22 is depressed, data or the like indicating a numeral or an associated one of various operations, which is registered for the key, is supplied to the control section 23.

The control section 23 controls the input section 22, the display section 24, the modulation/demodulation section 27 and so forth. The control section 23 performs processes based on signals supplied from the input section 22 and the modulation/demodulation section 27. Specifically, the control section 23 rings a calling tone according to the incoming call from another communication device, or transmits the address of another communication device when executing communication with the communication device.

The display section 24 displays various kinds of information under the control of the control section 23, has a display screen for liquid crystal display on one major surface of the casing. Specifically, the display section 24 displays information input from the input section 22, information transmitted externally, and information stored in an unillustrated memory.

The handset section 25 detects vibration caused by the utterance of a user, and converts it to an electrical signal. The handset section 25 converts an electrical signal supplied from the voice processing section 26 to a voice and outputs it.

The voice processing section 26 has an AD converter, a DA converter, an amplifier, a codec circuit, etc. none of which are illustrated. The voice processing section 26 performs amplification, A/D conversion, error correction coding and the like on the signal supplied from the handset section 25, and sends the resultant signal to the modulation/demodulation section 27. The voice processing section 26 performs error correction, D/A conversion, amplification and the like on the signal supplied from the modulation/demodulation section 27, and then sends the signal to the handset section 25.

The modulation/demodulation section 27 modulates a predetermined carrier signal according to the baseband signal supplied from the voice processing section 26 and sends the modulated signal to the radio transmission section 28. Further, the modulation/demodulation section 27 modulates an information signal sent from the input section 22 via the control section 23 and sends the modulated signal to the radio transmission section. Moreover, the modulation/demodulation section 27 demodulates an intermediate frequency signal (hereinafter called "IF signal") supplied from the radio transmission section 28 into a baseband signal, and sends the baseband signal to the voice processing section 26 or the display section 24.

The radio transmission section 28 mixes the IF signal supplied from the modulation/demodulation section 27 with the output from a frequency synthesizer into a radio signal, amplifies and sends the radio signal to the antenna 29. The radio transmission section 28 amplifies a radio signal supplied from the antenna 29, then mixes the radio signal with the output from the frequency synthesizer to yield an IF signal, amplifies the IF signal and sends the amplified IF signal to the modulation/demodulation section 27.

The antenna 29 transmits the radio signal supplied from the radio transmission section 28 to the base station 12. The antenna 29 receives a signal transmitted from the base station 12, and sends the signal to the radio transmission section 28.

The communication terminal 11 with the foregoing configuration first converts the vibration caused by the utterance of the user to an electrical signal, and sends the electrical signal to the voice processing section 26. The voice processing section 26 performs amplification, A/D conversion, coding, error correction coding and the like on the supplied signal. The baseband signal undergone various processes in the voice processing section 26 is modulated with a predetermined carrier signal to be supplied to the radio transmission section 28. The radio transmission section 28 mixes the supplied signal with the output from the frequency synthesizer to yield a radio signal, amplifies the radio signal, and sends the amplified radio signal to the antenna 29. Finally, the antenna 29 transmits the signal supplied from the radio transmission section 28 to the base station 12.

When the antenna 29 receives a radio signal from the base station 12, the antenna 29 sends the radio signal to the radio transmission section 28. The radio transmission section 28 amplifies the radio signal supplied from the antenna 29, mixes the amplified radio signal with the output from the frequency synthesizer to yield an IF signal, and amplifies the IF signal. The IF signal is transmitted from the radio transmission section 28 to the modulation/demodulation section 27 where it is demodulated and supplied to the voice processing section 26. The IF signal supplied to the voice processing section 26 is subjected to coding, error correction coding, D/A conversion, amplification and the like, and is then output via the handset section 25. Although the description of the operational example is given of a case where telephone communications are carried out using the communication terminal 11, the case is not restrictive. When communication by e-mail is executed, for example, the input section 22 and the display section 24 are used in place of the handset section 25, and similar communication is carried out via the modulation/demodulation section 27.

The detailed configurations of the base station 12 and the control station 15 will be described next.

Figure 5:
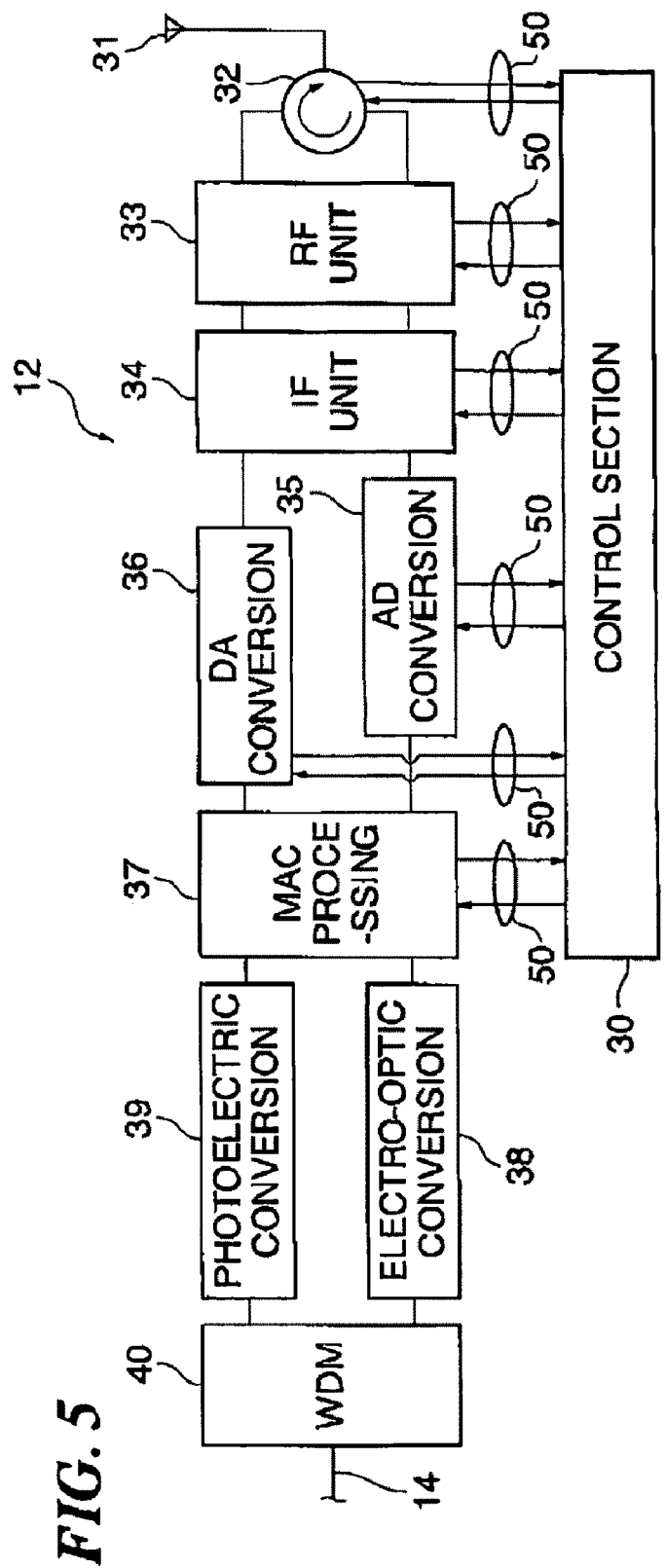
FIG. 5 is a diagram showing the block configuration of a base station.

As shown in FIG. 5, the base station 12 has an antenna 31 for transmission and reception of radio signals to and from the communication terminal 11, an antenna sharing unit 32 connected to the antenna 31, an RF unit 33 connected to the antenna sharing unit 32, an IF unit 34 connected to the RF unit 33, and an AD conversion section 35 and a DA conversion section 36 both of which are connected to the IF unit 34. The base station 12 also includes a MAC (Media Access Control) processing section 37, which is supplied with a signal digitized by the AD conversion section 35 and supplies a digital signal to the DA conversion section 36, an electro-optic conversion section 38 and a photoelectric conversion section 39 both connected to the MAC processing section 37, and a WDM section 40 connected to these conversion sections. The base station 12 further includes a control section 30 which is connected to the antenna sharing unit 32, the RF unit 33, the IF unit 34, the AD conversion section 35, the DA conversion section 36 and the MAC processing section 37.

The antenna sharing unit 32 is disposed to allow a single antenna 31 to share the function of transmitting signals to the communication terminal 11 and the function of receiving signals therefrom. That is, the antenna sharing unit 32 sends a radio signal received at the antenna 31 to the RF unit 33 and transmits a signal supplied from the RF unit 33 to the antenna 31.

The RF unit 33 mixes the signal sent from the antenna 31 via the antenna sharing unit 32 with an adequate local oscillation signal to frequency-convert a desired RF frequency signal to a desired IF frequency signal, and then transmits the IF frequency signal to the IF unit 34. In addition, the RF unit 33 mixes the signal sent from the IF unit 34 with an adequate local oscillation signal to frequency-convert a desired RF frequency signal, and then transmits the RF frequency signal to the antenna 31.

The IF unit 34 performs a process, such as automatic gain control (AGC) so that the IF frequency signal transmitted from the RF unit 33 has an adequate level, and performs a process of executing orthogonal detection on the resultant signal to frequency-convert the signal to a baseband signal, executing necessary bandwidth limiting, and then transmitting the resultant signal to the AD conversion section 35. The IF unit 34 performs orthogonal modulation of the IF carrier with the baseband signal transmitted from the DA conversion section 36 for conversion to a desired IF signal, and at the same time performs amplification to an adequate level and transmits the amplified signal to the RF unit 33. The importance of the present invention lies in that analog state information of a carrier wave is subjected to AD conversion before transmission without demodulation of the received radio signal. In the configuration, therefore, the IF unit 34 which converts an IF signal to a baseband signal is disposed in such a way that the sampling frequency at the time of AD conversion can be minimized. If the performance of the AD converter is sufficiently fast, however, an IF signal and an RF signal can be subjected to AD conversion directly. With the present configuration, the IF unit 34 and also the function of the RF unit 33 excluding, the amplification function may be omitted.

The AD conversion section 35, which is constituted by a so-called AD converter, converts an analog signal supplied from the IF unit 34 to a digital signal and outputs the digital signal to the MAC processing section 37. The DA conversion section 36, which is constituted by a so-called DA converter, converts a digital signal supplied from the MAC processing section 37 to an analog signal, and outputs the analog signal to the IF unit 34.

The MAC processing section 37 forms the digital signal input from the AD conversion section 35 into an IP packet sequence. The MAC processing section 37 performs a MAC process of adding an IP header for the IP protocol or a MAC header for the Ethernet (registered trademark), and further inserting an adequate label or tag to generate a MAC frame. The MAC processing section 37 performs various processes, such as header removal, packet arrangement and delay control, on the MAC frame received from the photoelectric conversion section 39.

The MAC frame has a frame structure which is fully compatible with the Ethernet (registered trademark) and the IP network. The MAC frame is formed by a TCP/IP stack layer, and can include a MAC address and IP address, unique to a device, and further an adequate label and tag, into the header of a packet, thus ensuring more reliable data transfer to a communication party.

Figure 6:
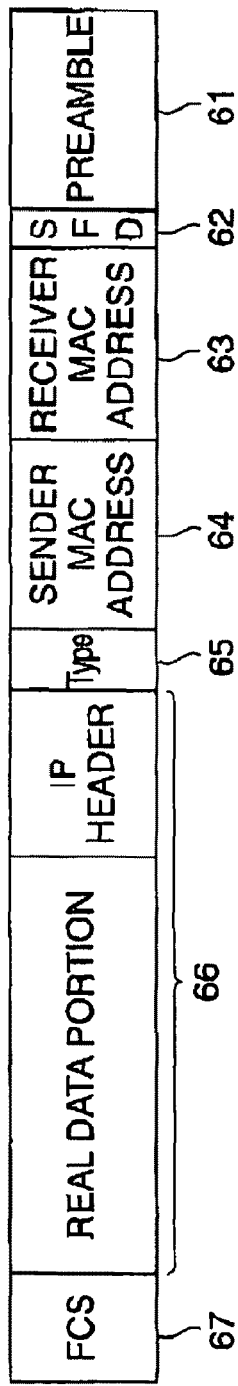
FIG. 6 is a diagram showing the structure of a MAC frame generated in a MAC processing section.

FIG. 6 shows an example of the structure of a MAC frame 6 generated in the MAC processing section 37. This structure of the MAC frame is not restrictive when the MPLS technique or the tag ULAN technique is used. The MAC frame 6 to be generated conforms to the structure of a MAC frame defined by IEEE 802.3, and includes a preamble 61 of seven octets notifying the start of the frame, an SFD (Start Frame Delimiter) 62 of one octet representing the start of an actual frame, a receiver MAC address 63 of six octets representing a frame receiver, a sender MAC address 64 of six octets representing a frame sender, a frame length/frame type 65 of two octets representing the length of data or the type of the frame, a data portion 66 of 46 to 1500 octets, and an FCS (Frame Check Sequence) 67 of four octets for confirmation of data. The data portion 66 includes an IP header and a real data portion constituting real data as a digital signal to be input from the AD conversion section 35.

The electro-optic conversion section 38 comprises a device for electro-optic conversion of the MAC frame 6 generated by the MAC processing section 37. The electro-optic conversion section 38 may comprise a so-called laser diode (LD) or the like which converts a supplied electrical signal to an optical signal.

The photoelectric conversion section 39 comprises a device for photoelectric conversion of an optical signal demultiplexed by the WDM section 40. The electro-optic conversion section 38 may be constituted by a so-called avalanche photodiode (PD) or PIN diode, which generates an electrical signal according to the light reception intensity, for example.

The WDM section 40 multiplexes optical signals generated by the electro-optic conversion section 38, and transfers the multiplexed signals to the optical fiber 14. The WDM section 40 separates the optical signal transmitted from the optical fiber 14, for example, wavelength by wavelength, and individually transmits the separated optical signals to the photoelectric conversion section 39.

The control section 30 controls the antenna sharing unit 32, the RF unit 33, the IF unit 34, the AD conversion section 35, the DA conversion section 36 and the MAC processing section 37 with predownloaded software 50. The control section 30 is an essential component when a communication process is executed based on so-called software defined radio (SDR). In this case, the control section 30 downloads software for rearranging the base station 12 from the control station 15, and reconstructs the specifications of the individual units. Note that when the communication process is not executed based on the SDR, it is not essential to provide the control section 30 with the above-described functions.

Figure 7:
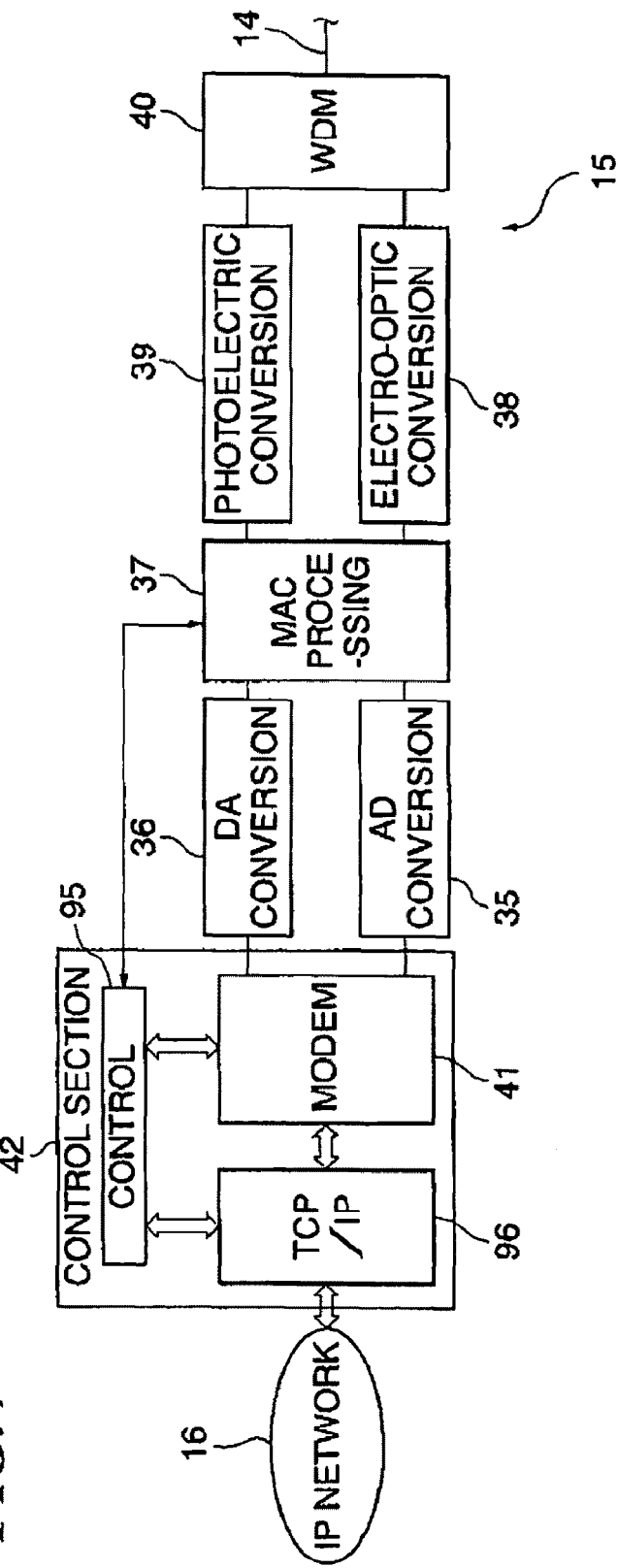
FIG. 7 is a diagram showing the block configuration of a control station.

As shown in FIG. 7, the control section 15 includes the WDM section 40 for transmission and reception of optical signals to and from the optical fiber 14, the electro-optic conversion section 38 which supplies the electro-optically converted optical signal to the WDM section 40, the photoelectric conversion section 39 which converts an optical signal demultiplexed by the WDM section 40 to an electrical signal, the DA conversion section 36 which performs DA conversion of the electrical signal converted by the photoelectric conversion section 39, the AD conversion section 35 which generates a digital signal to be supplied to the electro-optic conversion section 38 based on the analog signal from the MAC processing section 37, the MAC processing section 37 which is connected at least to the DA conversion section 36 and the AD conversion section 35, and a control section 42 which performs general control of the control station 15. The control section 42 includes a control section 95 which performs actual control, a modem section 41 connected to the DA conversion section 36 and the AD conversion section 35, and a TCP/IP section 96 for constructing an interface with the IP network 16.

In the control section 42, the modem section 41 performs demodulation of radio signal data received as an IP packet from a base station until real data contained in the radio signal data is obtained. When the real data is to be transmitted to the IP network 16, the TCP/IP section 96 performs a TCP/IP process before transmitting the data to the IP network 16. When data addressed to the communication terminal 11 or the base station 12 to which the communication terminal 11 belongs is received from the IP network 16, on the other hand, an adequate modulation process is performed before the data is transmitted to the AD conversion section 35. When radio signal data received as an IP packet from the base station 12 is addressed to a different base station 12, the modem section 41 performs demodulation of the radio signal data until real data is obtained, and performs a modulation process on the data before transmission to the AD conversion section 35. Destination information or the like acquired from the radio signal data acquired by the demodulation process is also used as control information for an MAC address to be added by the MAC processing section 37.

To avoid the redundant description in the following description, like or same reference numerals in FIG. 5 are given to those components and members of the control station 15 which are the same as those of the base station 12.

The operation of the wireless communication system 1 to which the present invention is adapted will be described next.

To begin with, a description will be given, by way of example, of a case where wireless communication between the communication terminal 11a and the communication terminal 11b is executed.

First, when a radio signal is transmitted from the user of the communication terminal 11a, for example, the antenna 31 at the base station 12b located near the communication terminal 11a receives the radio signal. The radio signal received via the antenna 31 is transmitted to the RF unit 33 via the antenna sharing unit 32 to be converted to an IF frequency signal, is transmitted to the IF unit 34, as needed, to be subjected to processing like AGC to have an adequate level. At the same time, the signal is converted to a baseband signal, and is then transmitted to the AD conversion section 35. The AD conversion section 35 performs AD conversion to provide a digital signal which is reconstructed into the MAC frame 6 by the MAC processing section 37 as shown in FIG. 6. At this time, a bit sequence specifically representing radio communication may be inserted in the frame type 65 or a newly provided unique frame type portion. This can improve the identity of the generated MAC frame 6.

The base station 12 dares not demodulate the radio signal received from the communication terminal 11. In the base station 12, therefore, the analog waveform of the radio signal converted to the intermediate frequency or the baseband is directly subjected to AD conversion to be a digital signal, and the digital radio signal is directly subjected to the MAC process. Therefore, analog variation information of the amplitude, phase and frequency equivalent to those of the radio signal received from the communication terminal 11 via the antenna 31 is digitized and is packetized to be reflected on the real data portion 66 in the MAC frame 6 generated by the MAC processing section 37. At the time of framing the digital signal obtained by AD conversion of the radio signal in the MAC processing section 37, adequate encryption may be effected. This can ensure security-maintained encapsulated transmission of a radio signal.

Packet data made by the MAC frame 6 formed by the MAC processing section 37 is electro-optically converted in the electro-optic conversion section 38, and is then transmitted to the optical fiber 14*b* via the WDM section 40 to be transmitted to the optical switches 13*a*, 13*b* connected to the optical fiber 14*b*.

The optical switch 13*a*, 13*b* reads the destination address or label, tag or the like added to the header of the MAC frame in the received packet data, and leads the read information to the addressed control station 15, the optical switch 13 to be the next destination and the addressed base station 12. At this time, the optical switch 13*a*, 13*b* may switch outputting of data by identifying the bit sequence described in the frame type. The optical switch 13*a*, 13*b* may convert the signal to an analog signal based on the identified bit sequence, and output the analog signal via an unillustrated analog output.

The control station 15 receives packet data received via the optical switch 13*b* and the optical fiber 14. When the control station 15 receives the packet data, first, the WDM section 40 shown in FIG. 7 demultiplexes the packet data and outputs the demodulated packet data to the photoelectric conversion section 39. The packet data output to the photoelectric conversion section 39 is photoelectrically converted, various kinds of information added to the header of the MAC frame 6 are read via the MAC processing section 37, and, as needed, a payload portion excluding the MAC frame 6 is transmitted to the DA conversion section 36. The DA conversion section 36 performs DA conversion on the payload portion to extract an analog signal, and transmits the analog signal to the modem section 41. The modem section 41 can acquire real data information contained in the received data by demodulating the analog signal. The destination and sender information acquired by the MAC processing section 37, destination terminal information and sender terminal information or the like for the real data, acquired via the modem section 41, are managed within the control station 15, and are used as the destination and control information at the time of constructing a packet to be transmitted or received and transferred.

The control station 15 transmits the received packet data to the receiver or the communication terminal 11*b*. As mentioned above, the MAC frame 6 is reconstructed in the MAC processing section 37, and is subjected to AD conversion in the AD conversion section 35, after which an optical signal is generated by the electro-optic conversion section 38. The generated optical signal is transmitted to the optical fiber 14 via the WDM section 40 and to the optical fiber 14*d* via the optical switch 13*b*.

The base station 12*e* demultiplexes the packet data received from the optical fiber 14*e* with the WDM section 40, and converts the demultiplexed packet data to an electrical signal in the photoelectric conversion section 39, and reads various kinds of information added to the header of the MAC frame 6 via the MAC processing section 37. The base station 12*e* reads frame information of the received packet data in the MAC processing section 37, extracts the necessary real data portion of the packet data, and sends the real data portion to the DA conversion section 36. The DA conversion section 36 converts the real data as a digital signal to an analog signal, which is in turn transmitted to the antenna 31 via the IF unit 34, the RF unit 33 and the antenna sharing unit 32. The analog signal is converted to a radio signal at the antenna 31 before being transmitted to the communication terminal 11*b*. The communication terminal 11*b* receives and reads the radio signal based on the above-described operation.

The optical signal received at the base station 12*e* is a signal which has not undergone a demodulation process in the base station 12*b* or a signal obtained by digitalization of the analog waveform of a radio signal converted to an intermediate frequency or baseband. Therefore, the base station 12*d* need not perform a modulation process.

That is, in the wireless communication system 1, the radio signal received from the communication terminal 11*a*, for example, is subjected to AD conversion without being demodulated in the base station 12*b* to yield the MAC frame 6, which is in turn transmitted to the optical fiber network 14 as the Ethernet (registered trademark). The transmitted optical signal is transmitted to the base station 12*e* under the control of the control station 15. In the base station 12*d*, the optical signal is subjected to DA conversion, is converted to a radio signal without being modulated, and is transmitted to the base station 12*b*.

In this manner, in a communication path leading to the base station 12*b*, the optical fiber network 14, the control station 15, the optical fiber network 14 and the base station 12*d*, a signal to be transmitted and received is constructed as an analog waveform equivalent to a radio signal is directly subjected to AD conversion and the resultant digital signal is packetized. That is, because the wireless communication system to which the present invention is adapted has effects equivalent to those of the case where at least the ROF technology is used, it is unnecessary to perform modulation and demodulation of a radio signal at each base station 12, thereby ensuring size reduction, cost reduction and general-purpose designing of a base station. Even if the services or the specifications are changed, therefore, the system configuration of the base station need not be changed, making it possible to improve the flexibility of the overall system.

Further, the wireless communication system to which the present invention is adapted converts an optical signal to be transmitted and received to a digital signal and packetizes the digital signal. Unlike in the conventional arts, this eliminates the need for using the analog modulation system in optical modulation. The present invention which transmits and receives optical signals as digital signals, unlike the conventional arts, need not take an advanced countermeasure against the non-linearity of optical devices and fiber dispersion. Because the present invention uses digital modulation in the optical modulation system and uses a frame format compatible with the IP network 16, the system may be constructed by fast and low-cost digital optical circuits, an exchange process in the IP network 16 can be handled in the same way as that for other ordinary packets.

In the wireless communication system 1, at the time of executing communication between the communication terminal 11*a* and the communication terminal 11*b* under the control of the control station 15, first, after a link is established between the base station 12*b* and the base station 12*e*, an optical signal may directly be transmitted and received between the link-established base station 12*b* and base station 12*e*. In this case, in transmitting a radio signal toward the communication terminal 11*b* from the communication terminal 11*a*, an optical signal is transmitted from the communication terminal 11*a* toward the communication terminal 11*b* through the optical fiber 14*b*, the optical switch 13*a*, the optical switch 13*b* and the optical fiber 14*e*.

Although the foregoing description of the embodiment has been given of the case where wireless communication is carried out between the communication terminal 11a and the communication terminal 11b by way of example, the configuration is not restrictive. The control station 15 may transmit the MAC frame 6 transmitted from the base station 12b, for example, to the IP network 16 as it is. The MAC frame 6 transmitted to the IP network 16 is directly transmitted to the terminal device 17 where the MAC frame 6 is demodulated to read out data comprising the data portion 66. Based on the above-described scheme, a signal may be transmitted to each communication terminal 11 from the terminal device 17 connected to the IP network 16, so that bidirectional signal transmission and reception is enabled.

Data to be transmitted to another addressed communication terminal 11 from the terminal device 17 on the IP network 16 may be previously modulated, be subjected to AD conversion, then be packetized into packet data which is transmitted to a plurality of base stations 12 via the optical fibers 14, so that the base stations 12 perform DA conversion on the received packet data, and transform the packet data into radio signals without modulation to be transmitted to other communication terminals 11.

For an application which should make the processing delay as small as possible while involving broadband radio signals to be relayed, it is important as to whether how a baseband signal after quantized sampling is handled as a packet frame. With the recent attempts to make AD/DA converts faster, a 2-input and 2-output type converter circuit corresponding to a more advanced modulation and demodulation system is becoming popular. This converter circuit is most suitable for AD conversion of an orthogonal-demodulated (IQ-demodulated) baseband signal. In case where outputs obtained through broadband and high-resolution conversion are transformed into IP packets, however, it is likely that an I channel signal and a Q channel signal which are generated at the same timing are transferred as different packets, thus causing a large delay in reproduced signals on the receiver side. While a delay between transmission and reception does not matter so much in unidirectional communication like broadcasting, relatively severe requirements are demanded in real-time bidirectional communication like telephone communication.

Figure 12A:
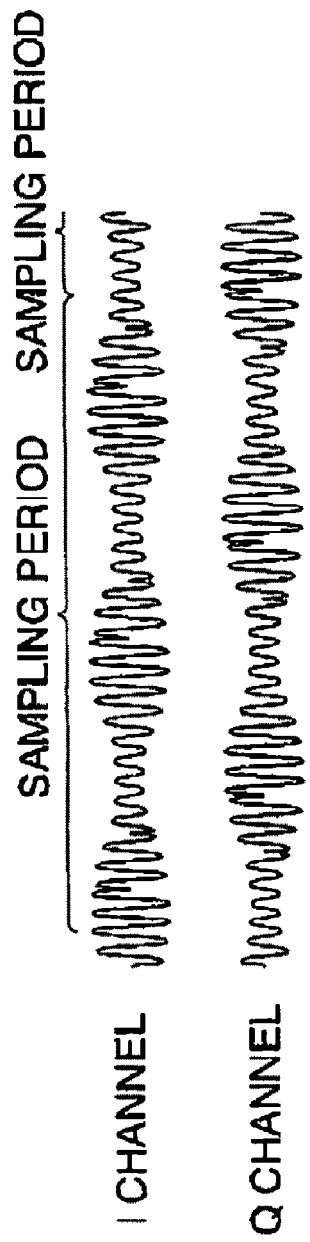
FIG. 12 is a diagram showing an example of packetization of an I channel and Q channel.
Figure 12B:
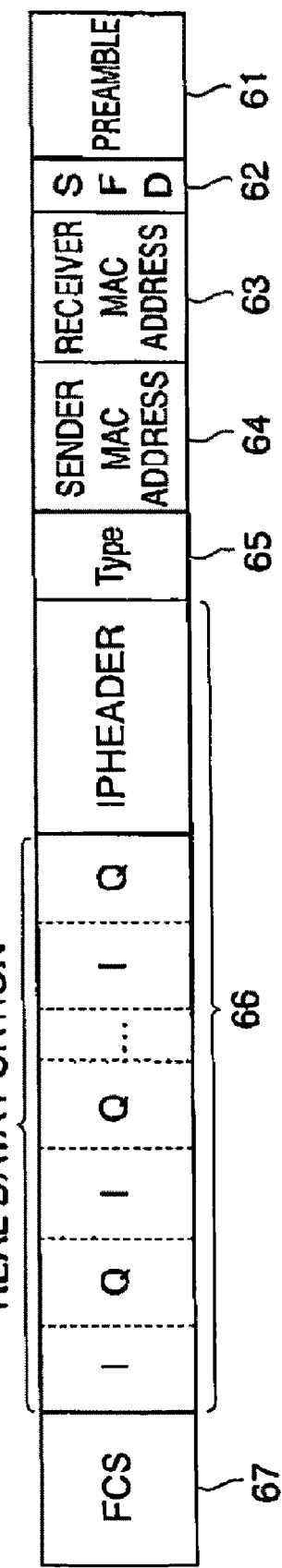

In the wireless communication system 1 to which the present invention is adapted, therefore, an I channel signal and a Q channel signal, which are analog baseband signals acquired by orthogonal demodulation of signals input to the RF unit 33 may be subjected to 2-channel sampling in parallel as shown in FIG. 12A. An orthogonal demodulator which performs the orthogonal demodulation may be configured to replace the IF unit 34 or the RF unit 33 in the above-described configuration. In the case of executing 2-channel sampling, both the I channel signal and Q channel signal are extracted in a plurality of sampling periods on the same time axis. In case of packetizing the I and Q channel signals, as shown in FIG. 12B, the sample values of the I channel and the sample values of the Q channel are alternately arranged in the real data portion 66 in the time sequential order, thereby generating a single piece of packet data. As the I channel signals and Q channel signals transmitted in this manner are sequentially extracted at predetermined time intervals, are alternately arranged, and are packetized, it is possible to generate packet data which follows up the real-time action and thus prevent a transmission delay involved in packetized transmission. Therefore, the present technique is adaptable to a wireless relay system which demands a slower transmission characteristic.

According to the present invention, communications among the communication terminals 11 may be controlled in such a way that the communications are carried out in the shortest paths. In this case, a wireless communication system 2 as shown in FIG. 8, for example, may be adapted.

The wireless communication system 2 includes communication terminals 11a, 11b as mobile terminals which a pedestrian can carry around, a plurality of base stations 45a, 45b, 45c for relaying communication by transmission and reception of radio signals to and from the communication terminal 11, control stations 49_1, 49_2, ..., 49_k, 49_R connected to the base stations 45a, 45b, 45c over an IP network 48, and an Ethernet (registered trademark) 47 connected to an optical switch 46 via an optical fiber 14 and having devices, such as L2/L3 switches, implemented therein. A description will be given of the case where only the base stations 45b, 45c are connected to the Ethernet (registered trademark) 47 by way of example in the example of FIG. 8.

Each base station 45, like the base station 12, performs AD conversion on a radio signal received from the communication terminal 11 without demodulation to generate a digital signal. The base station 45 packetizes the generated digital signal into packet data to be described later, and further performs electro-optic conversion on the packet data to generate an optical signal. The base station 45 multiplexes the generated optical signals and transmits the multiplexed signal via the optical fiber 14 which is connected to the base station 45. The base station 45, like the base station 12, converts the optical signal transmitted via the optical fiber 14, connected thereto, to an electrical signal, and performs DA conversion on the electrical signal to generate an analog signal. The generated analog signal is transformed into a radio signal to be transmitted to the communication terminal 11.

The optical switch 46 whose detailed description will be omitted for its configuration is the same as that of the optical switch 13, is constituted as a so-called L2 switch which conforms to the standards of the Ethernet (registered trademark).

The IP network 48, like the IP network 16, is a connectionless network which executes packet transfer determined by the IP.

The control station 49 includes the RAS (Remote Antenna Station) control station 49_R, and control stations 49_1, 49_2, ..., 49_k for controlling signals of individual frequency bands constituting a frequency-multiplexed signal.

The RAS control station 49_R performs status management and address registration processing of all the base stations 45, and in addition it controls the overall system including address management and status management of the individual control stations 49 associated with the base stations 45. The RAS control station 49_R also controls the download service to change the specification of software acquired by each base station 45 when the RAS control station 49_R is configured to be able to reconstruct the specifications of the individual base stations 45 based on a so-called SDR system. This can allow each base station 45 to be reconstructed as a so-called software radio device.

The control station 49_1 performs connection control for a radio signal to be transmitted and received using a radio frequency band f1, the control station 49_2 performs connection control for a radio signal to be transmitted and received using a radio frequency band f2, and the control station 49_k performs connection control for a radio signal to be transmitted and received using a radio frequency band fk. The control stations 49_1, 49_2, ..., 49_k respectively perform destination control and transfer control associated with packets equivalent to the individual radio frequency bands f1, f2, . . . , fk received. As the configurations of the RAS control station 49_R and control stations 49_1, 49_2, . . . , 49_k are the same as the configuration of the control station 15, their descriptions will be omitted below.

Next, the detailed configuration of the base station 45 will be described.

As shown in FIG. 8, the base station 45 has an antenna 31 for transmission and reception of radio signals to and from the communication terminal 11, an antenna sharing unit 32 connected to the antenna 31, RF units 52a, 52b connected to the antenna sharing unit 32, an AD conversion section 35 connected to the RF unit 52a, a DA conversion section 36 connected to the RF unit 52b, a control section 55, BPFs (Band-Pass Filters) 56_1, 56_2, . . . , 56_k connected to both the AD conversion sections 35 and the DA conversion section 36, BPFs 57_1, 57_2, . . . , 57_k connected to a DA conversion section 54, MAC processing sections 58, 59 connected at least to the control section 55 and the BPFs 56, 57, an electro-optic conversion section 38 connected to the MAC processing section 58, and an photoelectric conversion section 39 connected to the MAC processing section 59. The electro-optic conversion section 38 and photoelectric conversion section 39 are connected to a WDM section 40.

To avoid the redundant description in the following description, like or same reference numerals in FIG. 5 are given to those components and members of the base station 45 which are the same as those of the base station 12.

The RF unit 52a performs processes, such as frequency conversion of a signal, transmitted from the antenna via the antenna sharing unit 32, to have an IF band frequency and automatic gain control, as needed. The RF unit 52b converts a signal received from the DA conversion section 54 to a radio frequency band signal.

The control section 55 controls individual frequencies handled by the base stations, individual bandwidth information, and destination address information to be added by the base stations, with respect to a radio signal to be transmitted and received among the communication terminals 11 by analyzing a control packet C received by the base station 45 from the RAS control station 49_R. When the base station 45 is configured to be able to reconstruct the specifications thereof based on a so-called SDR system, the control section 55 also receives software need for reconstruction as the control packet C and uses the software in reconstructing a digital filter AD converter, DA converter, etc. which constitute the base station 45.

The BPF 56 filters the individual frequency components from the AD-converted digital signal. That is, the BPF 56_1, the BPF 56_2 and the BPF 56_k respectively extract a digital signal of the frequency f1, a digital signal of the frequency f2, and a digital signal of the frequency fk, and then transmit the digital signals to the MAC processing section 58. The BPF 57 likewise filters a signal output from the MAC processing section 59, and transmits the filtered signal to the DA conversion section 36.

Though not illustrated, each filtering can be done in an analog area, not in a digital area, or both digital and analog filtering structures can be employed.

In the case of performing filtering in an analog area, in FIG. 8, the layout orders of the DA conversion section 36 and BPFs 57, and the AD conversion section 35 and the BPFs 56 should be changed, and the DA conversion sections 36 and AD conversion sections 35 equal in number to the number of analog BPFs are required.

The MAC processing section 58 forms the digital signal supplied from the BPF 56 into an IP packet sequence. The MAC processing section 58 forms the MAC frame 6 based on destination information for each frequency band notified by the control section 55, and based on the digital signal of the frequency f1 transmitted from the BPF 56_1 and the digital signal of the frequency f2 transmitted from the BPF 56_2. The MAC processing section 59 performs various processes, such as header removal, packet arrangement and delay control, on the MAC frame received from the photoelectric conversion section 39.

The operation of the wireless communication system 2 with the foregoing configuration will be described next.

The base station 45a receives a radio signal from the communication terminal 11a via the antenna 31. The base station 45a may be configured to receive, for example, a wireless access request packet from the communication terminal 11a. The signal received at the antenna 31 is sent to the RF unit 52a via the antenna sharing unit 32, is subjected to various processes, and then is subjected to AD conversion in the AD conversion section 35. The AD-converted digital signal is transmitted to the BPFs 56_1 to 56_k to be filtered for the respective frequency components, and the filtered signals are transmitted to the MAC processing section 58. The MAC processing section 58 generates the MAC frames 6 by packetization of the signals frequency component by frequency component. A header based on the destination information transmitted from the control section 55 or a label addressed to the control station corresponding to the reception frequency band as the default setting may be added to the top MAC frame 6.

Packet data made by the MAC frame 6 formed by the MAC processing section 58 is electro-optically converted in the electro-optic conversion section 38, and is then transmitted to the optical fiber 14 via the WDM section 40. While the packet data sequence has pieces of packet data equivalent to the radio frequency bands f1, f2, . . . , fk, as shown in FIG. 8, those packets normally start with a wireless access request packet for requesting establishment of a communication link or a wireless access acknowledge packet for acknowledging the request packet. Those pieces of packet data are formed as independent MAC frames 6. After the sender MAC address 63 of packet data as the MAC frame 6 which has reached the optical switch 46 is read, the packet data is transferred to the IP network 48 connected to the optical switch 46. In the IP network 48, the packet data equivalent to the radio frequency band f1 is transmitted to the control station 49_1, the packet data equivalent to the radio frequency band f2 is transmitted to the control station 49_2, and the packet data equivalent to the radio frequency band fk is transmitted to the control station 49_k.

When the control stations 49_1 to 49_k need the received pieces of packet data, the control stations 49_1 to 49_k demodulate the packet data to identify various kinds of information and execute predetermined controls. Upon reception of a wireless access request packet or a wireless access acknowledge packet, each control station 49 can read a destination address and a sender address described in the packet by demodulating and analyzing the packet, can notify those pieces of information as the control packets C to each base station that performs relaying to establish a link and can store the information in a memory area in the control section of the base station 45. Accordingly, in second and later communications, each base station 45 may read the stored destination address information of the communication party from the control section to form a MAC frame 6, thereby omitting communications going through the control station 49.

Under the control of the control stations 49_1 to 49_k and the RAS control station 49_R, an end-to-end link via the TCP/IP connection between the base stations 45a and 45c is established between the communication terminals 11a and 11b that actually carry out communications. Suppose that the communication terminals 11a and 11b communicate with each other at the radio frequency band f1 at which the control station 49_1 should manage the connection. First, the communication terminals 11a and 11b register, beforehand, information indicating that they respectively belong to the base station 45a and the base station 45b in the control station 49_1 via the respective base stations 45a and 45b. Accordingly, the control station 49_1 has a correlation table of the addresses of the communication terminals and the addresses of the base stations to which the communication terminals belong.

The optimal path may be specified by using any protocol conventionally used. After the optimal path is specified, the control station 49 transmits various kinds of label information and the destination address to each base station 45.

Each base station 45 identifies the optimal path based on the various kinds of label information and the destination address transmitted from the control station 49. In subsequent communications, packet data is transmitted and received via the optimal path without going through the control station 49.

After specifying the optimal path, the control station 49 may transmit information on the specified optimal path to each base station 45. Accordingly, the base station 45 can directly read the specified optimal path and can carry out establishment of a link through the optimal path.

Because the wireless communication system 2 is premised on that packet data to be transmitted is subjected to AD conversion and is turned into an optical frame, in particular, the sampling frequency and individual constants of the BPFs 56 should be optimized. However, the wireless communication system 2 has advantage in that the optimization can be executed based on software downloaded via the RAS control station 49_R.

Figure 9:
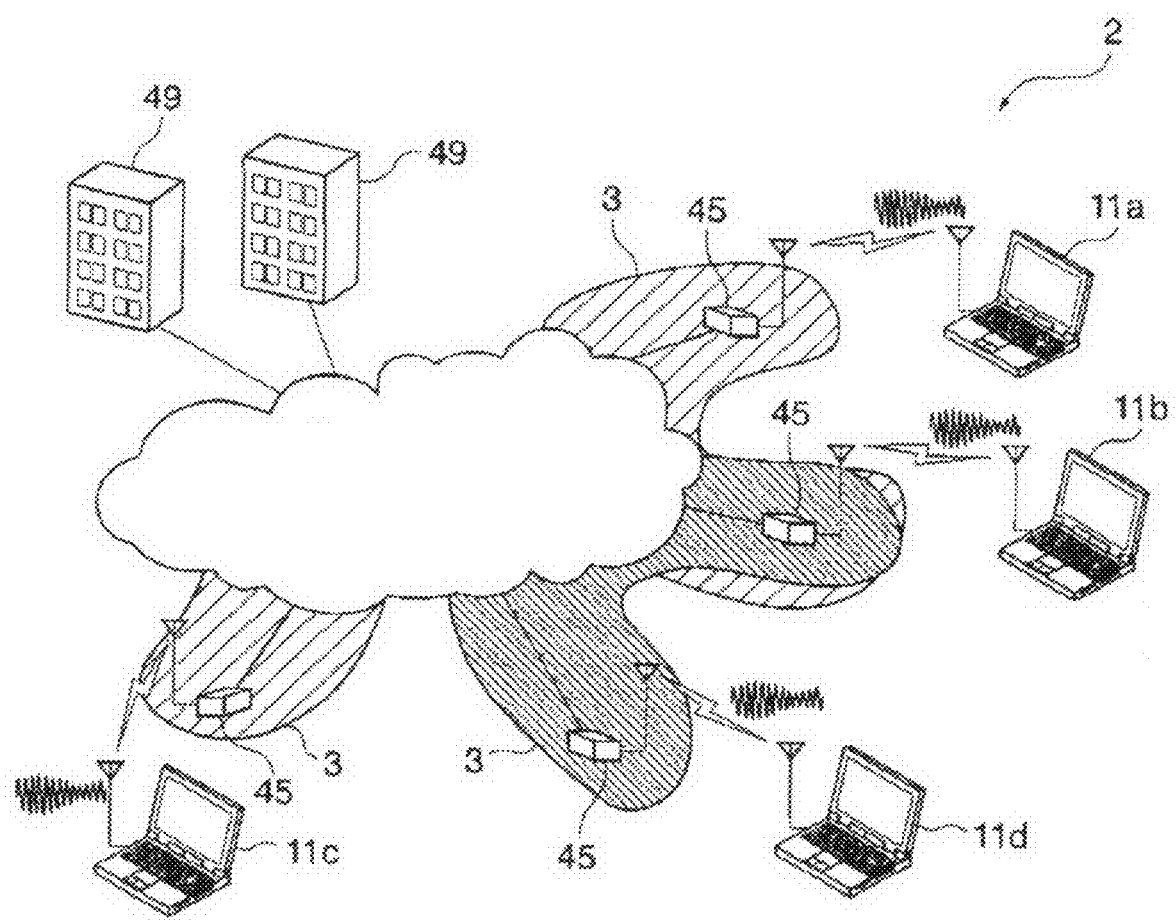
FIG. 9 is a diagram showing the concept of a virtual private network suitable for wireless access to be realized by the adaptation of the present invention.

FIG. 9 shows the concept of a virtual private wireless access network (VPWAN) 3 which achieves end-to-end communication or subnet-to-subnet communication over a virtually separated network by actually sharing the same IP network as used by communication between other ends or communication between other subnets, and allows the communication areas to be considered as practically different wireless communication areas.

The VPWAN 3 is constructed by an IP network or the like to which the base station 45 and the control station 49 are connected. In the VPWAN 3, a plurality of communication terminals 11 which communicate with one another execute the communication in a so-called peer-to-peer (P2P) communication system via the base station 45.

To start communication between, for example, the communication terminal 11a and the communication terminal 11c based on the P2P communication system, the base station 45 first accesses the control station 49. Then, the accessed control station 49 establishes a P2P communication link between the communication terminals 11. The control station 49 also notifies the address of the communication terminal 11a and/or the address of the base station 45 to which the communication terminal 11a belongs to the communication party (or parties) or communication terminal 11c and/or the base station 45 to which the communication terminal 11c belongs. The control station 49 likewise notifies the address of the communication terminal 11c and/or the address of the base station 45 to which the communication terminal 11c belongs to the communication party (or parties) or communication terminal 11a and/or the base station 45 to which the communication terminal 11a belongs. Thereafter, the communication terminal 11a and the communication terminal 11c execute subsequent communications through the P2P communication link based on the notified addresses.

The establishment of the P2P communication link and the management of the addresses may be executed based on, for example, an SIP (Session Initiation Protocol). In this case, the control station 49 serves as an SIP server, and when the communication terminal 11a attempts to access the VPWAN 3, the base station 45 which has detected the attempt notifies the control station 49 of presence information of the communication terminal 11a and the attribute, such as information on the local base station, according to the SIP procedures, thereby registering the information in, or updating predetermined presence information and the attribute of the local base station in the address correlation table.

Likewise, in the control station 49, in a case where the communication terminal 11c attempts to access the VPWAN 3, the base station 45 which has detected the attempt notifies the control station 49 of presence information of the communication terminal 11c and the attribute, such as information on the local base station, according to the SIP procedures, thereby registering the information in, or updating predetermined presence information and the attribute of the local base station in the address correlation table. Upon reception of a request from the communication terminal 11c to connect to the communication terminal 11a, the control station 49 notifies the communication terminal 11c of the address of the communication terminal 11a based on the SIP, and the communication terminal 11c sets the address as the destination address of the communication terminal 11a and stores it in the memory or the like for subsequent communications.

Accordingly, the communication terminal 11a and the communication terminal 11c execute subsequent communications via the P2P communication link.

That is, in the communication using the VPWAN 3, it is possible to create an ideal situation where practically it is only the communication terminals 11a, 11c which perform modulation and demodulation processes at the time of carrying end-to-end wireless communication. The communication using the VPWAN 3 can realize so-called ad hoc communication which can permit the terminal devices 11 to directly carry out wireless communications with one another without going through the control station 49, thus ensuring effective functions in communication in emergency as well as in communication in an office environment and a home network environment.

The base station 45a which has received the wireless access request packet from the communication terminal 11a adds a destination label addressed to the control station 49_1 to the packet, and transmits the packet to the network, while the control station 49_1 knows that the packet is addressed to the communication terminal 11b by demodulating and analyzing the contents of the packet. Next, the control station 49_1 adds the destination label addressed to the base station 45c to which the communication terminal 11b belongs to the received wireless access request packet based on the correlation table the control station 49_1 has beforehand, and transmits the resultant packet to the network. Upon reception of the packet, the base station 45c removes the label therefrom and transmits the resultant packet to the communication terminal 11b.

The communication terminal 11b which has received the wireless access request packet returns a wireless access acknowledge packet. The base station 45c receives the wireless access acknowledge packet, adds a label addressed the control station 49_1 to the packet, and transmits the packet to the network.

The control station 49_1 knows that the packet is the wireless access acknowledge packet addressed to the communication terminal 11a from the communication terminal 11b by demodulating and analyzing the contents of the packet, and adds the destination label of the base station 45a to which the communication terminal 11a belongs to the packet, and transfers the packet to the network.

Those procedures allow the communication terminals 11a and 11b to resume the communication via the control station 49_1. After confirming that connection between the communication terminals 11a and 11b has been established, the control station 49_1 may notify each base station of label information indicating the optimal network routing path as the control packet C at the time the communication terminals 11a and 11b communicate with each other through the connection between the base stations 45a and 45c, store the label information in each base station, and add a destination label based on the information at the time the base stations 45a and 45c add destination labels in later packet communications between the communication terminals 11a and 11b, so that the packets are directly exchanged between the base stations without going through the control station.

In the communication using the VPWAN 3, not only each communication terminal 11 is notified of the address of the communication party or the like, but also each base station 45 may be notified of the optimal path analyzed by the control station 49. Accordingly, each base station 45 may packetize a radio signal into packet data, so that at the time of transmitting the packet data to the VPWAN 3, the control station 49 establishes a communication link based on the optimal path notified to the base station 45 from the control station 49 to realize the P2P communication through the optimal path.

The P2P communication system using the microwave band appears to be an easier connection link system for a user, for the system can be realized at a low cost. With the P2P communication system using the microwave band, however, sufficient antenna directivity cannot be expected, causing preinterference or interference. A network based on the P2P communication system using the submillimeter wave band or the millimeter wave band, on the other hand, opposing links should be disposed opposite each other in the bidirection based on the prospect or the like of the antenna, and the cost would increase, while no particular restrictions are placed on the directivity of the antenna and the preinterference and interference problem.

According to the invention, therefore, communication between the communication terminal 11 and each base station 45 may be carried out with microwaves in the VPWAN 3, while communication between the base stations 45 is carried out with the millimeter wave (or submillimeter wave) band network. The user connects to the nearest base station 45 through microwave-based wireless communication via the communication terminal 11. The base station 45 transfers packet data to another base station 45 over the millimeter wave (or submillimeter wave) band network while keeping the analog state of the received radio signal, based on the above-described operation. Although the transmission of the packet data may be carried out via the VPWAN 3 as a cable network, packet data transmission through the VPWAN 3 constructed as a millimeter wave (or submillimeter wave) band wireless communication network can achieve improvements on the flexibility in constructing the network and cost reduction. In case where the VPWAN 3 is constructed as a wireless communication network as mentioned above, particularly, when a communication link is established between the base stations 11 by the millimeter wave (or submillimeter wave) band, the directivity of the antenna can be expected substantially, thus overcoming the problems of preinterference and interference. This system is therefore advantageous in its extremely high security.

Particularly, the base stations 45 are normally fixed in the VPWAN 3 as a wireless communication network. If a microwave radio signal is received between the fixed base stations 45 from the user's communication terminal 11, the radio signal is converted to packet data of a millimeter wave (or submillimeter wave) without demodulation while maintaining the analog state, and is transmitted. Next, the destination base station 45 which has received the packet data converts the packet data again to a microwave radio signal without demodulation and transmits the radio signal to the communication terminal 11.

That is, while the base station 45 serves as a so-called access point of converting a microwave band radio signal transmitted from the communication terminal 11 to a millimeter wave signal, the base station 45 executes no demodulation process. In executing the demodulation process, normally, there are restrictions of the modulation and demodulation standards unique to the VPWAN 3, coding and so forth, the present invention can create an ideal situation where practically it is only the communication terminals 11a, 11c which perform modulation and demodulation processes. Accordingly, the present invention can be adapted to VPWANs 3 which employ any wireless communication system or coding system, completely irrespective of the radio-signal modulation and demodulation standards and coding system which execute P2P transmission. In this respect too, broadband network providers who provide the P2P service for microwave radio signals do not need to know wireless interface information (modulation and demodulation system, coding system) of the user, thus ensuring provision of the P2P service for extremely secured and safe microwave radio signals.

Although the foregoing description has been given of the example where the present invention is adapted to the P2P communication system, the present invention is not restrictive to this particular case, and it may be designed to be adapted to IP-based P-MP (Point to Multipoint) communication as seen in the recent push-talk service. The P-MP communication is the generic term for one-to-multiple directional communication systems. That is, with the present invention adapted to the P-MP communication, the base station 45 converts a microwave-band radio signal transmitted from the communication terminal 11 to a millimeter-wave signal without demodulation, and transmits the millimeter-wave signal to other multiple base stations 45. As a result, information is transmitted to a plurality of communication terminals 11 which are accessed by a plurality of base stations 45. Even in the case of executing the P-MP communication, it is possible to create an ideal situation where practically it is only the communication terminals 11 which perform modulation and demodulation processes. Even in the case of executing the P-MP communication, the system may be controlled based on the SIP.

The technical concepts in the wireless communication systems 1, 2 may be adapted to a broadcast wave distributing system.

Figure 10:
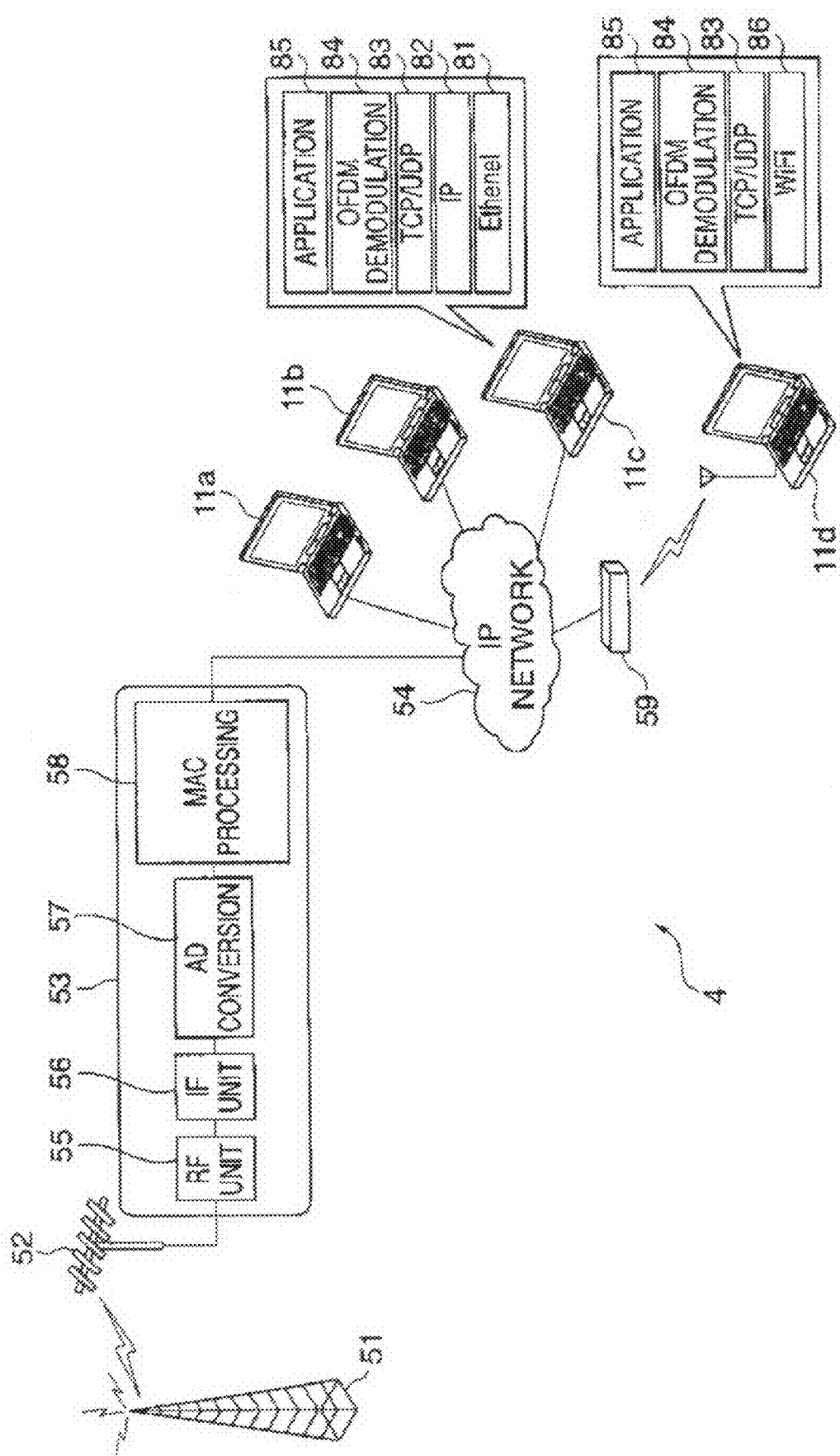
FIG. 10 is a diagram showing an example of the configuration of a broadcast wave distributing system to which the present invention is adapted.

FIG. 10 shows the configuration of a broadcast wave distributing system 4 to which the present invention is adapted. The broadcast wave distributing system 4 includes a radio wave tower 51 which transmits broadcast waves, an antenna 52 which receives the broadcast waves from the radio wave tower 51, a remote antenna unit 53 connected to the antenna, an IP network 54 connected to the remote antenna unit 53, and a radio base station 59 connected to the IP network 54. The remote antenna unit 53 has an RF unit 55, an IF unit 56, an AD conversion section 57, and a MAC processing section 58.

The antenna 52 is constituted by a VHF/UHF antenna or the like for receiving broadcast waves.

The RF unit 55 amplifies a broadcasting signal received at the antenna 52, performs a process, such as frequency conversion, on the broadcasting signal, and then outputs the processed signal to the IF unit 56. The IF unit 56 further converts the IF-band broadcasting signal input from the RF unit 55 to a baseband signal, and transmits the baseband signal to the AD conversion section 57. The AD conversion section 57 performs AD conversion on the input baseband signal and supplies the AD-converted baseband signal to the MAC processing section 58. When a sufficiently fast AD converter and network can be expected, the configuration may be changed so that the IF-band broadcasting signal is directly AD-converted, thereby eliminating the need for the IF unit 56, or that the RF-band broadcasting signal received from the antenna 52 is directly AD-converted, thereby substantially eliminating the need for both the RF unit 55 and IF unit 56.

The MAC processing section 58 forms digital signals input from the AD conversion section 57 into an IP packet sequence with the TCP/IP stack. Finally, the MAC processing section 58 generates the aforementioned MAC frame 6 by performing a MAC process, such as adding a MAC header for the Ethernet (registered trademark).

The radio base station 59 is sited as an access point constituting the wireless LAN. A wireless LAN card is loaded into the communication terminal 11*d* which is communicable over the wireless LAN formed around the radio base station 59.

The operation of the broadcast wave distributing system 4 with the foregoing configuration will be described next.

Broadcast waves received through the antenna 52 from the radio wave tower 51 are amplified adequately by the RF unit 55, and are then frequency-converted to have an IF band broadcast wave. The IF band broadcast wave is further transformed into a baseband signal by the IF unit 56, is then AD-converted by the AD conversion section 57, and is turned to a MAC frame in the MAC processing section 58. The MAC framing can cope with transmission to the IP network 54, and can further cope with the IP network 54 which is constructed by the Ethernet (registered trademark).

Packet data generated in the MAC processing section 58 is transmitted to the individual communication terminals 11*a* to 11*c* via the IP network 54, or it is transmitted to the communication terminal 11*d* via the radio base station 59.

The packet data transmitted to the communication terminals 11*a* to 11*c* is structured by a protocol stack as shown in FIG. 10. That is, in the protocol stack, a physical layer, such as 100BASE-T cable or 1000BASE-T cable (neither shown) is defined at the bottommost layer, and an Ethernet (registered trademark) 81 is defined as a data link layer overlying the physical layer.

An IP (Internet Protocol) 82 for standardizing an interface for data transfer on the IP network 54 is disposed on the data link layer, and TCP/UDP (Transmission Control Protocol/ User Datagram Protocol) 83 is constructed on the IP 82. The UDP is the protocol to allow an IP packet at a lower layer to be used directly by an application. An OFDM (Orthogonal Frequency Division Multiplexing) demodulation layer 84 on the TCP/UDP 83 is an upper-rank protocol for demodulating broadcast waves which use orthogonal frequency division multiplexing system as a modulation system, and an application layer 85 located thereon is provided to display demodulated broadcast waves. The communication terminals 11*a* to 11*c* can receive packet data comprised of such a protocol stack and demodulate the packet data to acquire video images or sounds.

Packet data transmitted to the communication terminal 11*d* is defined in such a way that WiFi 86 typified by IEEE 802.11b or IEEE 802.11a defining a MAC layer and underlying layers is defined as the bottommost layer above which the TCP/UDP 83, the OFDM demodulation layer 84 and the application layer 85 are defined in order. The communication terminal 11*d* receives packet data comprised of such a protocol stack, and demodulates the packet data to acquire video images or sounds.

In the broadcast wave distributing system 4, the broadcast waves are subjected to AD conversion at the remote antenna unit 53 without demodulation and are turned into a MAC frame to be transmitted to the IP network 54. Over the IP network 54, packet data which is the broadcast waves framed directly is transmitted toward the individual communication terminals 11. Each communication terminal 11 which has received the packet data performs a demodulation process for the first time. In the broadcast wave distributing system 4, particularly, the packet data keeping the wireless format can be transmitted to each communication terminal 11 connected to the existing IP network 54 while keeping the wireless format based on analog information of the radio signal as in the ROF.

In the broadcast wave distributing system 4, packet data can be transmitted to the communication terminal 11*d* via the wireless LAN from the radio base station 59. The communication terminal 11*d* which is being connected to the wireless LAN can receive packet data as broadcast waves via a software-based tuner. Indoor, in general, an LAN (wireless LAN) specialized for the IP network 54 is more widely used to end users than a feeder line specialized for broadcasting purposes. According to the invention, many communication terminals 11 used indoor, if connected to the broadband via the IP network 54, can receive broadcast waves and improve the general-purpose usage.

Further, in the broadcast wave distributing system 4, a one-segment broadcasting signal of terrestrial digital broadcasting, for example, can be transmitted to each communication terminal 11 based on similar processes. While many users prefer receiving one-segment broadcasting signals using portable communication terminals 11 particularly in buildings and station areas, the present invention can allow the remote antenna unit 53 to turn data to be transmitted to the IP network 54 to a MAC frame before transmission, so that one-segment broadcast distribution can be realized by directly using an LAN environment including a prearranged existing wireless LAN. This eliminates the need to construct a new infrastructure, such as disposing gap-filler devices or layout of cables to be connected thereto indoor as well as outdoor, thus reducing the cost of the overall system and shortening the schedule to construct the system.

The broadcast wave distributing system 4 can practically enable terrestrial digital broadcasting signal to areas where an IP network like optical cables are arranged, and is useful as a countermeasure for radio dead zones.

Figure 11:
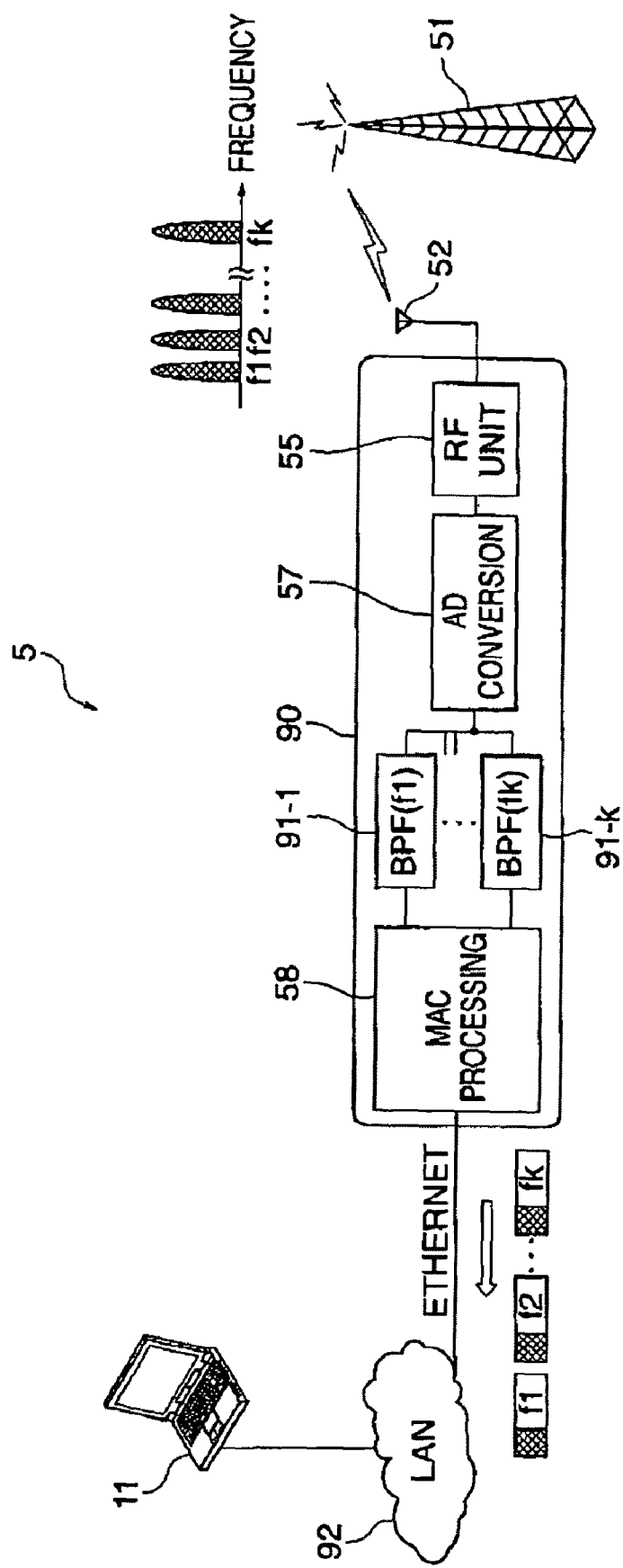
FIG. 11 is a diagram showing an example of a broadcast wave distributing system which distributes broadcast waves of multiple channels.

FIG. 11 shows an example of a broadcast wave distributing system 5 which distributes broadcast waves of multiple channels. To avoid the redundant description in the following description, like or same reference numerals are given to those components and members of the broadcast wave distributing system 5 which are the same as those of the broadcast wave distributing system 4.

The broadcast wave distributing system 5 has a radio wave tower 51 which transmits broadcast waves, an antenna 52 for receiving the broadcast wave from the radio wave tower 51, a remote antenna unit 90 connected to the antenna 52, an LAN 92 based on the Ethernet (registered trademark) connected to the remote antenna unit 90, and a communication terminal 11 connected to the LAN 92. The remote antenna unit 90 has an RF unit 55, an AD conversion section 57, BPF 91_1 to BPF 91__k and a MAC processing section 58.

The BPF 91 filters the individual frequency components from a digital signal AD-converted by the AD conversion section 57. That is, the BPF 91_1, BPF 91_2 and BPF 91__k respectively extract a digital signal of the frequency f1, a digital signal of the frequency f2, and a digital signal of the frequency fk, and transmit the digital signals to the MAC processing section 58.

The operation of the broadcast wave distributing system 5 with the foregoing configuration will be described next.

First, broadcast waves to which channels are assigned frequency by frequency are received through the antenna 52. The broadcast waves are amplified to the adequate reception level in the RF unit 55 using an LNA (Low Noise Amplifier), and are further down-converted to an adequate IF band. The AD conversion section 57 performs AD conversion on the signal output from the RF unit 55 at an adequate sampling frequency and quantization bits.

The digital signal generated through AD conversion in the AD conversion section 57 is distributed by the number of television broadcasting channels, and only broadcasting signals of desired channels are extracted by the BPF 91_1 to BPF 91__k. Digital data output from the BPF 91_1 to BPF 91__k is packetized with the TCP/IP stack in the MAC processing section 58, and is transformed into a MAC frame to be output to the LAN 92. The communication terminal 11 connected to the LAN 92 receives packet data of the frequency of the desired reception channel, and demodulates the packet data based on the software-based tuner.

The broadcast wave distributing system 5 can transmit a signal keeping analog information of a radio signal, as MAC-framed packet data, from the remote antenna unit 90, similarly to the ROF system, so that the existing LAN 92 based on the Ethernet (registered trademark) can be used directly as a transfer medium, thus enhancing the general-purpose usage of the system.

Figure 13:
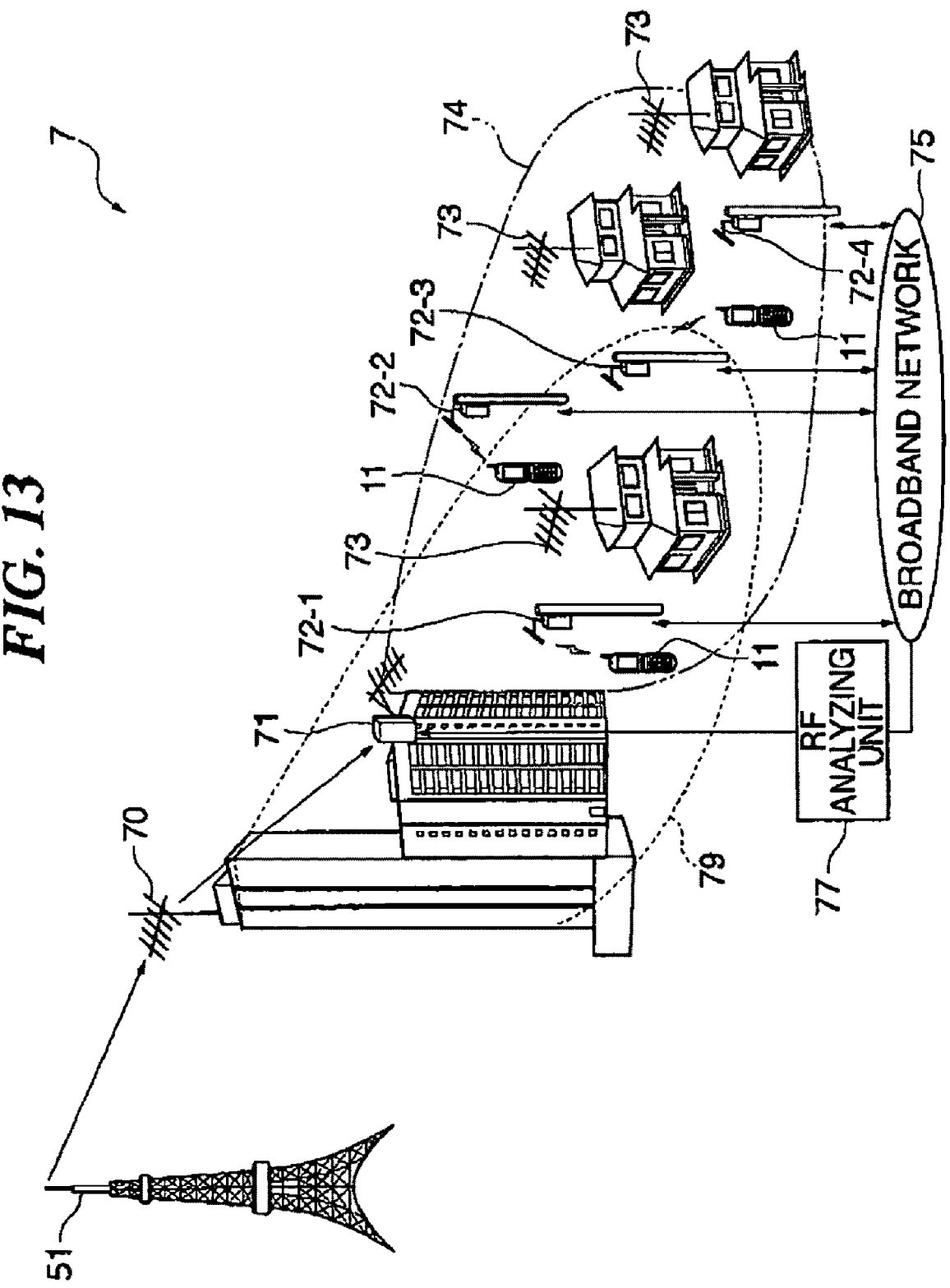
FIG. 13 is a structural diagram of a broadcast distributing system which enables gap-filler relay.

In a case where the technical concepts in the wireless communication systems 1, 2 are adapted to a broadcast wave distributing system, the system may be configured as a broadcast distributing system 7 that enables gap-filler relay as shown in FIG. 13.

The broadcast distributing system 7 has a radio wave tower 51 which transmits broadcast waves, a repeater 70 which relays broadcast waves from the radio wave tower 51, a repeater 71 which further relays the broadcast waves relayed from the repeater 70, base stations 72 which receive the broadcast waves relayed by the repeater 71, and an indoor antenna 73. In the example of FIG. 13, the repeater 71 is configured to be able to transmit broadcast waves to base stations 72_1, 72_2, 72_3, 72_4 and the indoor antenna 73 located within a service area 74.

The base stations 72_1 to 72_4 are connected to a broadband network 75, typified by the Ethernet (registered trademark) or the like, and the broadband network 75 is connected to an RF analyzing unit 77 and the repeater 71. The base stations 72_1 to 72_4 transmit broadcast waves to, for example, communication terminals including cellular phones having a television receiver function.

Figure 14:
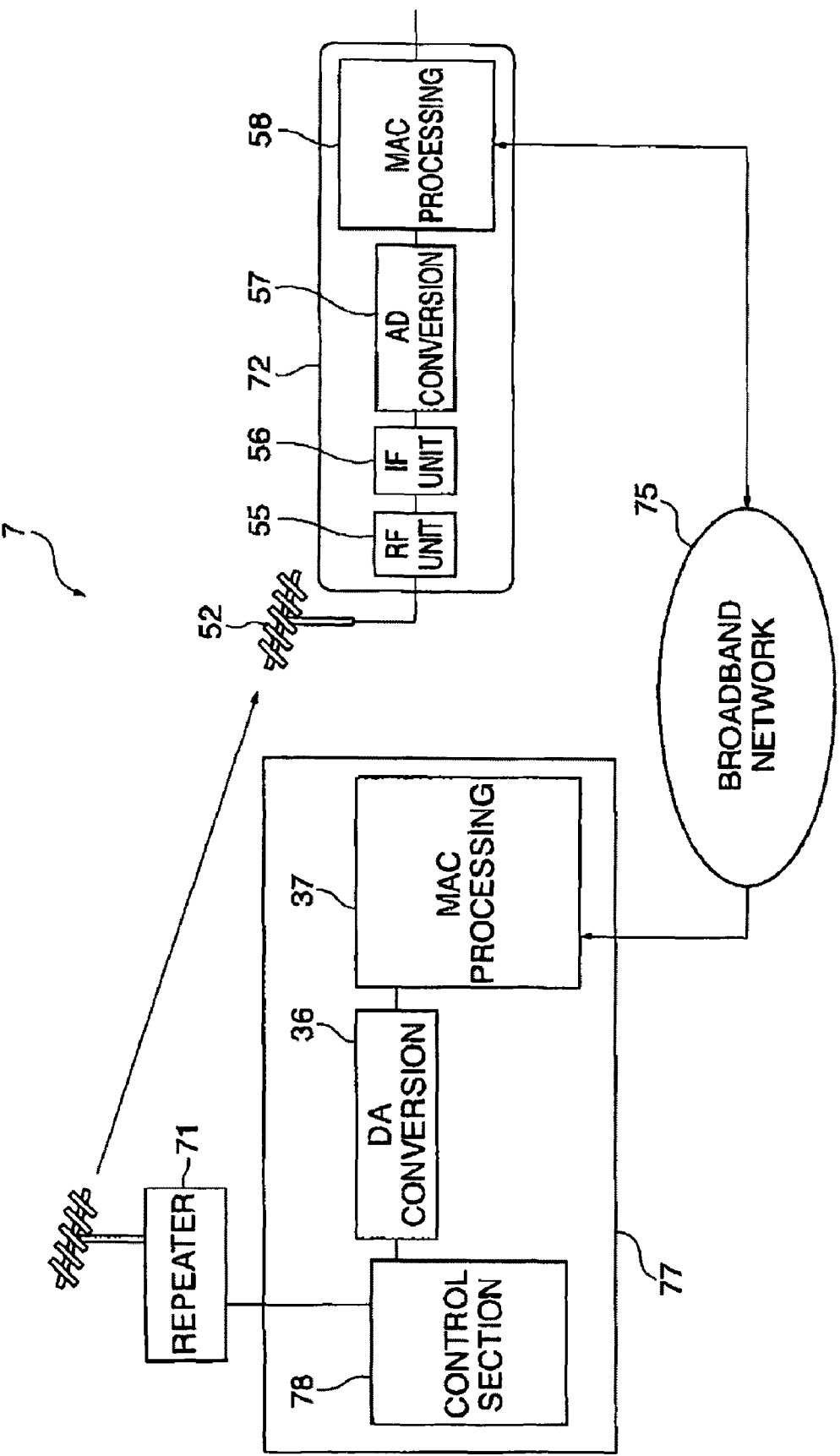
FIG. 14 is a diagram showing the further detailed configuration of the broadcast distributing system which enables gap-filler relay.

FIG. 14 shows the more detailed configuration of the broadcast distributing system 7. To avoid the redundant description in the following description, like or same reference numerals are given to those components and members which are the same as those in FIGS. 7 and 10.

Each of the base stations 72_1 to 72_4 has an antenna 52 which receives broadcast waves, an RF unit 55, an IF unit 56, an AD conversion section 57 and a MAC processing section 58.

The RF analyzing unit 77 has a control section 78 which controls the MAC processing section 37, the DA conversion section 36 and the overall RF analyzing unit 77, demodulates and analyzes an analog signal transmitted from the DA conversion section 36, and controls the repeater 71 based on the analysis result.

The operation of the broadcast distributing system 7 of the present invention will be described next.

Broadcast waves transmitted via the repeater 71 are received at the antenna 52 in the base station 72, amplified to the adequate level in the RF unit 55, and then frequency-converted to IF band broadcast waves. The IF band broadcast waves are further converted to a baseband signal by the IF unit 56. The baseband signal is AD-converted in the AD conversion section 57 and is then MAC-framed in the MAC processing section 58.

Packet data generated in the MAC processing section 58 is transmitted to the RF analyzing unit 77 over the broadband network 75, and transmitted to the communication terminal 11 via wireless communication means (not shown).

The packet data transmitted to the RF analyzing unit 77 is sent to the MAC processing section 37 where various kinds of information added to the header of the MAC frame 6 are read and a payload portion having the MAC frame 6 removed therefrom as needed is transmitted to the DA conversion section 36. The DA conversion section 36 performs DA conversion on the payload portion to extract an analog signal. The control section 78 identifies from which one of the base stations 72_1 to 72_4 the signal has been transmitted based on the sender information acquired in the MAC processing section 37. The control section 78 reads the power size, the directivity and interference degree of the broadcast waves transmitted from the identified base station 72 and information on channels, through the real data acquired from a plurality of base stations. Accordingly, the RF analyzing unit 77 can discriminate the signal quality of the broadcast waves transmitted to the identified base station 72.

Next, the RF analyzing unit 77 controls the repeater 71 based on the discriminated signal quality. That is, when the discriminated signal quality is impaired, the RF analyzing unit 77 can determine that the repeater 71 cannot receive the broadcast waves properly. In this case, the RF analyzing unit 77 controls the repeater 71 under the control of the control section 78 implemented in the RF analyzing unit 77. The repeater 71 changes the transmission conditions for the broadcast waves so that the signal quality of the broadcast waves received by the identified base station 72 can be improved under the control of the RF analyzing unit 77.

The broadcast distributing system 7 which operates in the above-described manner enables gap-filler relay. Suppose that as shown in FIG. 13, for example, an interference area 79 is produced by the influence of a building or the like, thus degrading the discriminated signal quality of broadcast waves received at the base station 72_1. In this case, the RF analyzing unit 77 discriminates the current signal quality of broadcast waves at the base station 72_1 through the power size, the directivity of the broadcast waves transmitted to the identified base station 72_1 and information on channels. If the power of the broadcast waves at the base station 72_1 is lower than the reference level, the broadcast waves may be shielded by a building or the like. To overcome this problem, the RF analyzing unit 77 controls the repeater 71 in such a way as to improve the reception power of the broadcast waves to the base station 72_1. Likewise, when it is discriminated as a result of determining the discriminated signal quality of the broadcast waves at the base station 72_1 that the broadcast waves at the base station 72_1 are interfered somehow, it is likely that interference occurs between the broadcast waves directly transmitted from the radio wave tower 51 and the broadcast waves transmitted from the repeater 71, for example, and that high-fidelity relaying of the broadcast waves cannot be realized. To overcome the problem, the RF analyzing unit 77 controls the repeater 71 in such a way as to prevent occurrence of the interference of the broadcast waves to the base station 72_1.

In this way, it is possible to monitor the signal qualities of broadcast waves at all the base stations 72_1 to 72_4 located in the service area 74 via the RF analyzing unit 77 and collectively monitor information at multiple points. As a result, one base station 72 present in the interference area 79 can be specified, and the RF analyzing unit 77 can be controlled so that only the specified base station 72 can receive adequate broadcast waves. This can ensure so-called gap-filler relay adequately.

In the broadcast distributing system 7, particularly, the broadcast waves are subjected to AD conversion at each of the base stations 72_1 to 72_4 without demodulation, and are transformed into a MAC frame to be transmitted to the broadband network 75. The broadband network 75 transmits packet data, which is the broadcast waves directly framed, toward the RF analyzing unit 77. Then, the RF analyzing unit 77 which has received the packet data will execute a demodulation process for the first time. That is, data which is acquired by merely packetizing a so-called RF signal is transmitted in the process from the base stations 72_1 to 72_4 to the RF analyzing unit 77, and is demodulated and analyzed for the first time in the RF analyzing unit 77.

In the process from the base stations 72_1 to 72_4 to the RF analyzing unit 77, the packet data may be transmitted with the transfer rate matching with the circuit quality under the conditions of the real time, the sub real time, asynchronous state, or the like.

It is therefore unnecessary to provide a structure to perform a demodulation process in the base stations 72_1 to 72_4, thus significantly simplifying the scale of the apparatus. While the base stations 72 are required to be disposed at multiple points, the scale of the apparatus at the base station 72 can be simplified in the broadcast distributing system 7 to which the present invention is adapted, and it is unnecessary to provide expensive measuring instruments at all the locations in the base stations 72. As an apparatus which performs a demodulation process, a single RF analyzing unit 77 is sufficient. This can reduce the cost of the overall system, and is very advantageous from the viewpoint of realizing a gap-filler system particularly at the time of intensive monitoring and intensive control of the reception conditions of broadcast waves at multiple points at one location.

The broadcast distributing system 7 to which the present invention is adapted can determine if the base station 72 at each point is functioning properly or is failing or has an abnormality, and can also determine if relaying currently carried out is actually valid.

According to the invention, the RF analyzing unit 77 may be implemented in the repeater 71. This modification can eliminate a communication path from the RF analyzing unit 77 to the repeater 71.

Transmission of packet data from the base stations 72_1 to 72_4 to the RF analyzing unit 77 should not necessarily be executed always and may be executed at predetermined time intervals. While a failure or abnormality in the base station 72 should be monitored for 24 hours a day, continuous monitoring is not so essential. That is, the amount of calculation and the amount of data processing in the RF analyzing unit 77 can be reduced by intermittently transmitting signals toward the RF analyzing unit 77 from the base station 72 every several minutes or every several hours, thus improving the overall system efficiency.

Figure 15:
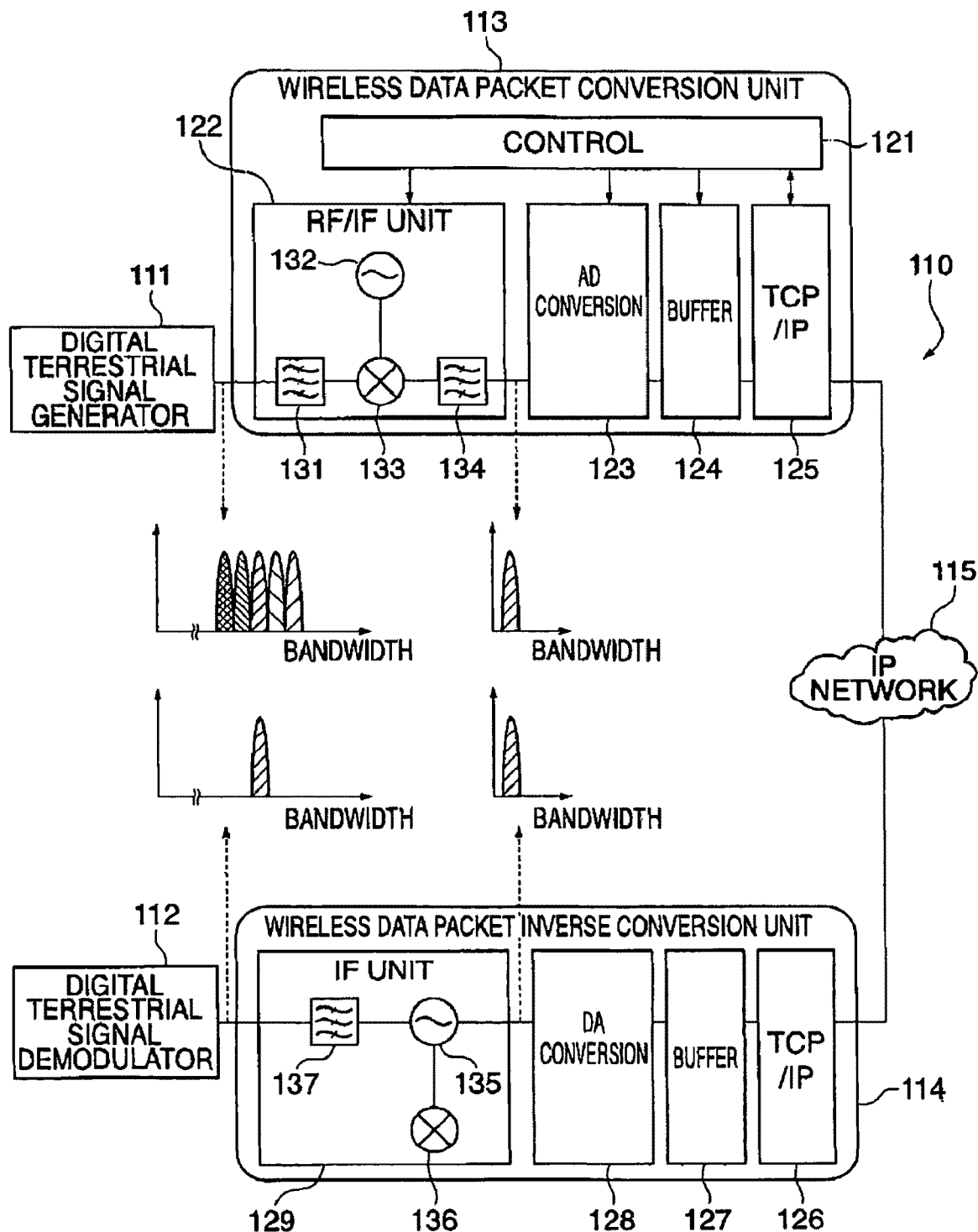
FIG. 15 is a structural diagram of a broadcasting signal relay system capable of switching the number of segments of a broadcasting signal to be transmitted according to the communication state.

The present invention can be adapted to a broadcasting signal relay system 110 as shown in, for example, FIG. 15.

The broadcasting signal relay system 110 includes a digital terrestrial signal generator 111 which generates a digital terrestrial signal, a wireless data packet converting unit 113 which receives the digital terrestrial signal comprised of a plurality of segments transmitted from the digital terrestrial signal generator 111, and converts the signal to packet data, an IP network 115 connected to the wireless data packet converting unit 113, a wireless data packet inverse converting unit 114 which is connected to the IP network 115 and inversely converts the packet data to a digital terrestrial signal as a radio signal, and a digital terrestrial signal demodulator 112 which is typified by a so-called portable communication terminal or the like which receives the digital terrestrial signal transformed into a radio signal, and demodulates the signal.

The digital terrestrial signal generator 111, placed in, for example, a broadcasting station, generates a signal for digital terrestrial broadcasting, and uses the signal as a digital terrestrial signal as a radio signal or a cable signal.

The wireless data packet converting unit 113 has an IF unit 122, an AD conversion section 123, a buffer unit 124 and a TCP/IP unit 125, all connected to a control section 121.

The IF unit 122 limits the bandwidth of the digital terrestrial signal comprised of a plurality of segments, transmitted from the digital terrestrial signal generator 111, using a filter 131. The IF unit 122 has a multiplier 133 which multiplies the signal band-limited by the filter 131 by a reference signal oscillated by a reference signal oscillator 132, and a down-converter 134 which down-converts a signal output from the multiplier 133 to a signal with a lower frequency.

The AD conversion section 123 performs AD conversion on an input baseband signal, and outputs the AD-converted baseband signal to the buffer unit 124. The buffer unit 124 temporarily stores the baseband signal, and then sends the baseband signal to the TCP/IP unit 125 under the control of the control section 121. The TCP/IP unit 125 performs a TCP/IP process on the signal output from the buffer unit 124, finally packetizes the signal into packet data, and transmits the packet data to the IP network 115. Transmission of the packet data over the IP network 115 is carried out based on, for example, a RTP (Real-time Transport Protocol). The RTP is the protocol used to transmit and receive data that demands a real-time property, such as voices or video images, over the TCP/IP network.

The wireless data packet inverse converting unit 114 has a TCP/IP unit 126, a buffer unit 127, a DA conversion section 128, and an IF unit 129. The TCP/IP unit 126 performs a TCP/IP process on packet data transmitted from the wireless data packet converting unit 113 over the IP network 115. The buffer unit 127 temporarily stores the data output from the TCP/IP unit 126. Data from the buffer unit 127 is DA-converted in the DA conversion section 128 and is transformed into a radio signal via the IF unit 129 to be transmitted to the digital terrestrial signal demodulator 112.

The IF unit 129 has a multiplier 135, a reference signal oscillator 136 and an up-converter 137. The reference signal oscillator 136 oscillates a reference signal similar to the one performed by the reference signal generator 132. The multiplier 135 multiplies the reference signal transmitted by an analog signal from the DA conversion section 128. The multiplied signal is up-converted to have a higher frequency by the up-converter 137.

The operation of the broadcasting signal relay system 110 with the foregoing configuration will be described next. Upon reception of packet data from the wireless data packet converting unit 113 over the IP network 115, first, the wireless data packet inverse converting unit 114 analyzes the received packet data to generate bandwidth information on the bandwidth that guarantees communication with the wireless data packet converting unit 113. Next, the wireless data packet inverse converting unit 114 transmits the generated bandwidth information to the wireless data packet converting unit 113. Upon reception of the bandwidth information transmitted from the wireless data packet inverse converting unit 114, the wireless data packet converting unit 113 controls the number of segments of the digital terrestrial signal to be transmitted.

When the bandwidth information transmitted from the wireless data packet inverse converting unit 114 describes that the communication state is good, for example, the wireless data packet converting unit 113 packetizes all the digital terrestrial signal comprised of thirteen segments into packet data, and transmits the packet data to the wireless data packet inverse converting unit 114. Accordingly, the user of the digital terrestrial signal demodulator 112 can enjoy high-quality video images. When the bandwidth information transmitted from the wireless data packet inverse converting unit 114 describes that the communication state has become poor, on the other hand, the wireless data packet converting unit 113 packetizes only one segment into packet data to be transferred. Accordingly, the user of the digital terrestrial signal demodulator 112 can enjoy so-called one-segment broadcasting. When the RTP-based data stream transfer is to be executed, the transfer rate may be controlled by a RTCP (RTP Control Protocol).

FIG. 15 shows an example of the bandwidth distribution when only one segment is packetized into packet data to be transferred. A signal comprised of a plurality of segments is transmitted from the digital terrestrial signal generator 111. Suppose that the bandwidth information transmitted from the wireless data packet inverse converting unit 114 describes that the communication state has become poor. In this case, the signal is band-limited to be a one-segment signal via the filter 131, and is further down-converted by the down-converter 134. Under the situation, the data is transferred over the IP network 115 and is up-converted in the IF unit 129 in the wireless data packet inverse converting unit 114.

Even the broadcasting signal relay system 110 with such a configuration can create an ideal state where it is only the digital terrestrial signal demodulator 112 which performs a demodulation process, and, like the above-described system, can simplify the system configuration to reduce the cost.

Figure 16:
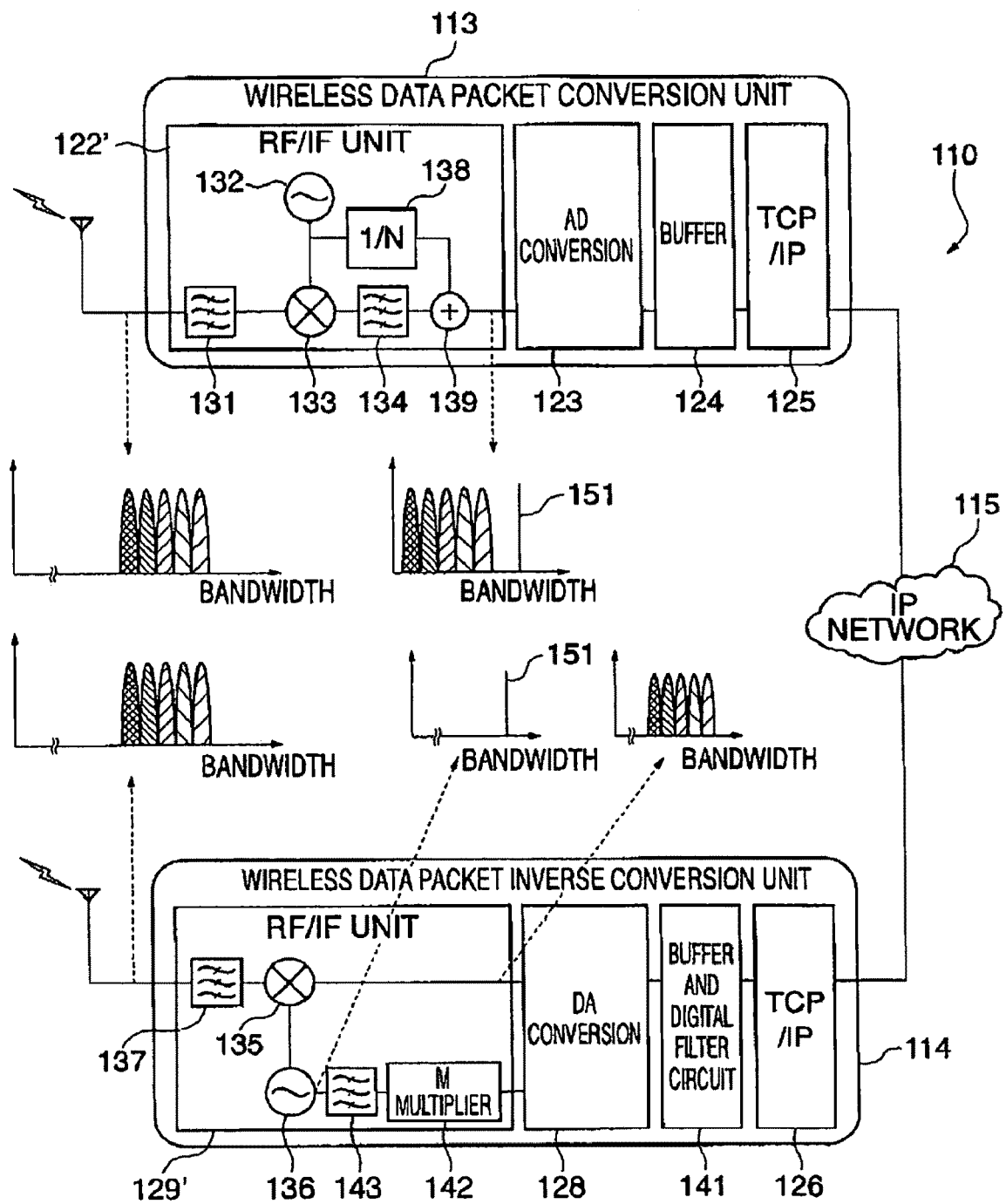
FIG. 16 is another structural diagram of the broadcasting signal relay system capable of switching the number of segments of a broadcasting signal to be transmitted according to the communication state.

FIG. 16 shows a modification of the broadcasting signal relay system 110, and like or same reference numerals are given to those components and members which are the same as those in FIG. 15 to avoid the redundant description below.

An RF/IF unit 122' in the broadcasting signal relay system 110 in FIG. 16 has a 1/N frequency-divider 138 connected to the reference signal generator 132 and an adder 139 connected to the 1/N frequency-divider 138 and the down converter 133 accompanied with the 1/N frequency-divider 138 and the band-pass filter 134. The wireless data packet inverse converting unit 114 has a buffer and digital filter circuit 141 connected to the TCP/IP unit 126. An RF/IF unit 129' has an M multiplier 142 connected to the DA conversion section 128, and an amplifier 143 disposed between the M multiplier 142 and the reference signal oscillator 136. The 1/N frequency-divider 138 illustrated in FIG. 16 can be replaced with an independent oscillator which outputs a low frequency approximately the same as the frequency output from the 1/N frequency-divider 138, and is isolated from the reference signal generator 132.

In the broadcasting signal relay system 110 as shown in FIG. 16, the reference signal output from the reference signal oscillator 132 is frequency-divided by 1/N times with the 1/N frequency divider 138 and the frequency-divided signal is added to a signal down-converted by the down-converter 133 with the band-pass filter 134 by the adder 139 in addition to the above-described operation. As a result, as shown by the bandwidth distribution in FIG. 16, a frequency-divided signal 151 appears on the signal comprised of a plurality of segments. The digital terrestrial signal comprised of a plurality of segments with the frequency-divided signal 151 added thereto is transformed into packet data to be transmitted to the wireless data packet inverse converting unit 114 of the communication party. The frequency-divided signal 151 is separated from the digital terrestrial signal by the buffer and digital filter circuit 141. The buffer and digital filter circuit 141 uses so-called digital filtering, and can easily extract even a narrow frequency band. Accordingly, even the frequency-divided signal 151 is extracted from the digital terrestrial signal with high efficiency.

The frequency-divided signal 151 is converted to an analog signal in the DA conversion section 128, and is transmitted to the M multiplier 142 to be multiplied by M. The multiplied signal has an unnecessary component removed in the band-pass filter 143 before being sent to the injection-locked oscillator 136. Because the combination of the M multiplier 142, the band-pass filter 143 and the injection-locked oscillator 136 is a circuit to reproduce the reference signal used on the transmission station side, it may take another configuration. For example, the M multiplier 142 may be changed to an N multiplier which is the reciprocal of the frequency dividing ratio on the transmission side, and the injection-locked oscillator 136 may be changed to an amplifier. That is, the reference signal oscillator 136 oscillates a reference signal synchronous with the frequency-divided signal 151 sent from the band-pass filter and synchronous with the reference signal used by the transmission station. As a result, it is possible to synchronize the reference signals for frequency conversion in the wireless data packet converting unit 113 and the wireless data packet inverse converting unit 114 with each other, and eventually overcome the problem of phase noise, frequency offset or the like.

Figure 17:
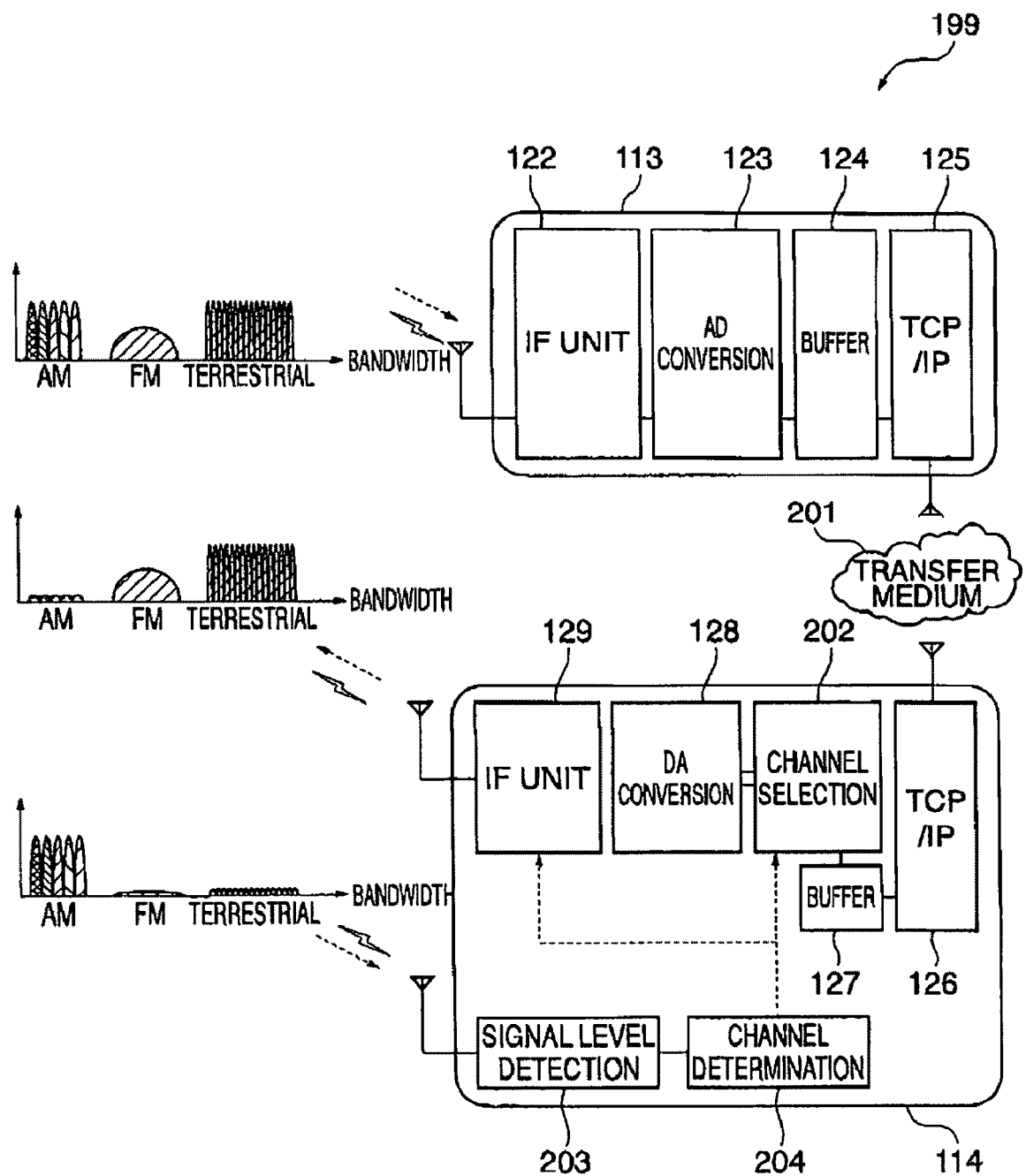
FIG. 17 is a structural diagram of a broadcasting signal relay system which relays a broadcasting signal in a radio wave dead zone such as an underground street or market.

The present invention can be adapted to a broadcasting signal relay system 199 as shown in FIG. 17, for example. The broadcasting signal relay system 199 is adapted in relaying AM broadcasting, FM broadcasting and terrestrial broadcasting to radio wave dead zones, such as underground streets or markets. To avoid the redundant description in the following description, like or same reference numerals are given to those components and members of the broadcasting signal relay system 199 which are the same as those of the broadcasting signal relay system 110.

In the broadcasting signal relay system 199, the wireless data packet converting unit 113 and the wireless data packet inverse converting unit 114 communicate with each other via a transfer medium 201 to which a cable/wireless IP or a simple P2P link or the like is adapted.

The wireless data packet inverse converting unit 114 has a channel selecting section 202 connected between the buffer unit 127 and the DA conversion section 128. The wireless data packet inverse converting unit 114 has a signal level detecting section 203 that detects the level of an external received signal, and a channel determining section 204 that determines the frequency channels of a signal to be transmitted from the wireless data packet inverse converting unit 114 and a signal to be removed therefrom, based on the received signal detected by the signal level detecting section 203. The channel determining section 204 is connected to the channel selecting section 202 and the IF unit 129. The channel selecting section 202 limits the bandwidth of the signal sent from the buffer unit 127 according to the frequency channel determined by the channel determining section 204.

The operation of the broadcasting signal relay system 199 with the above-described configuration will be described below.

First, AM, FM and terrestrial signals are transmitted to the wireless data packet converting unit 113 as shown in FIG. 17. The wireless data packet converting unit 113 packetizes the signals into packet data without modulation/demodulation and transmits the packetized signals to the wireless data packet inverse converting unit 114 via the transfer medium 201. The wireless data packet inverse converting unit 114 performs a TCP/IP process and buffering process on the signals transmitted via the transfer medium 201. The signal level detecting section 203 detects the level of the residual radio signal and analyzes the level of interference from nearby stations in the area where the wireless data packet inverse converting unit 114 is provided. The detection and analysis results are sent to the channel determining section 204 which determines the frequency channels of a signal to be transmitted from the wireless data packet inverse converting unit 114 and a signal to be removed therefrom.

When the channel determining section 204 can determine that the AM broadcasting signal remains in the area where the wireless data packet inverse converting unit 114 is provided, it is understood that relaying the AM broadcasting signal is unnecessary, and only the remaining FM broadcasting signal and terrestrial broadcasting signal should be relayed. In this case, the channel selecting section 202 passes only the FM broadcasting signal and terrestrial broadcasting signal in the AM broadcasting signal, FM broadcasting signal and terrestrial broadcasting signal sent from the buffer unit 127, and limits the bandwidth of the AM broadcasting signal. As a result, the FM broadcasting signal and terrestrial broadcasting signal alone are DA-converted and are frequency-converted to be transmitted.

The channel selection by the channel selecting section 202 is executed only in a digital area, but is not restrictive and may be executed in an analog area after DA conversion. In this case, the channel selection in the analog area may be executed through a filter (not shown) provided in the IF unit 129, so that the configuration of the channel selecting section 202 can be omitted.

As apparent from the above, the broadcasting signal relay system 199 to which the present invention is adapted can monitor the radio conditions in the area where the wireless data packet inverse converting unit 114 is provided, determine a relay signal needed in the converting-unit located area, and relay signals only in the optimal broadcasting signal channel to the converting-unit located area. The system 199 can realize the real-time response to a change in the frequency environment in the converting-unit located area.

Figure 18:
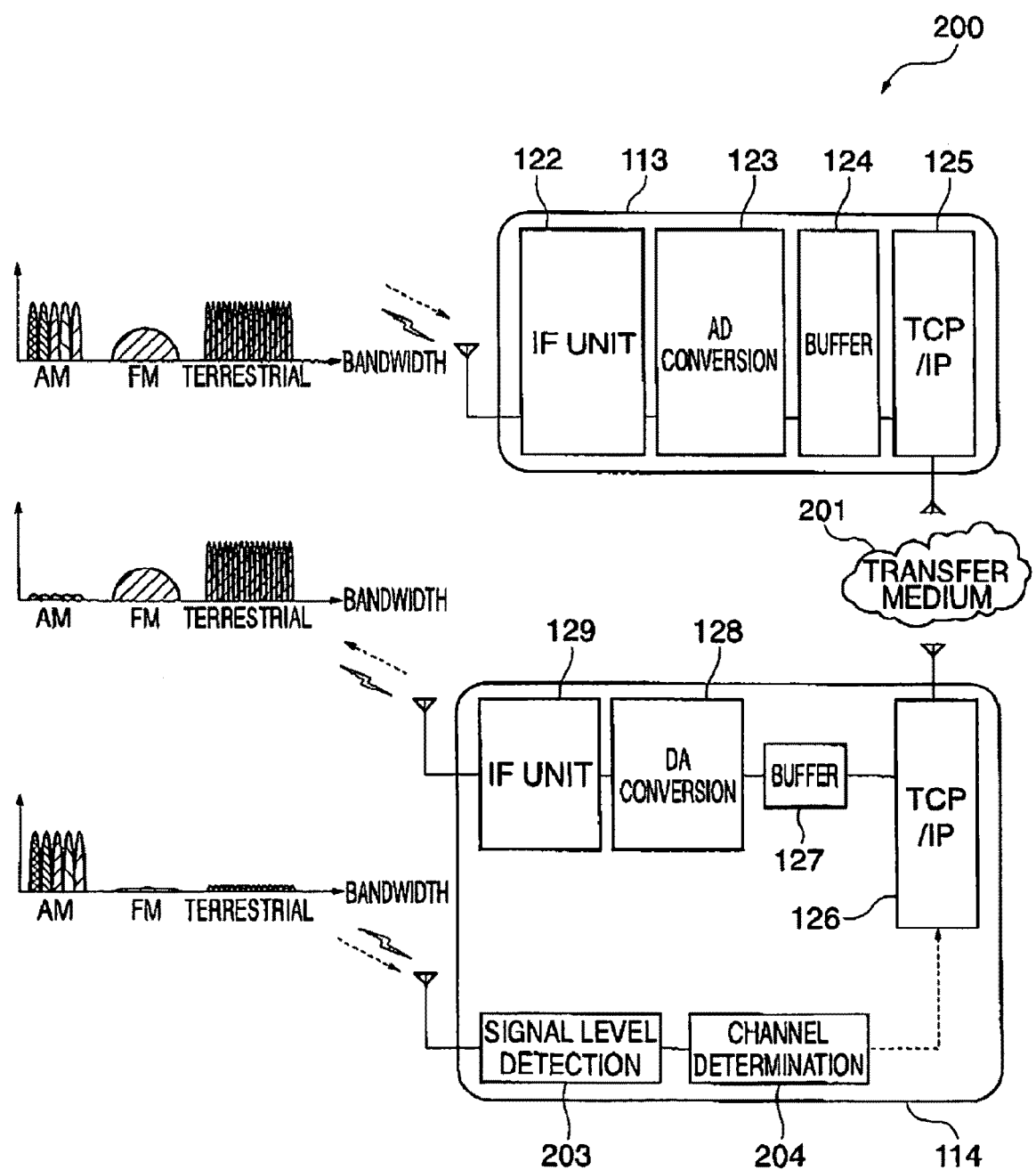
FIG. 18 is a diagram showing another example of the configuration of the broadcasting signal relay system shown in FIG. 17.

FIG. 18 shows the configuration of a broadcasting signal relay system 200 as a modification of the broadcasting signal relay system 199. To avoid the redundant description in the following description, like or same reference numerals are given to those components and members of the broadcasting signal relay system 200 which are the same as those of the broadcasting signal relay system 199.

In the broadcasting signal relay system 200, the channel determining section 204 is connected to the TCP/IP unit 126. The TCP/IP unit 126 is connected with the buffer unit 127, the DA conversion section 128 and the IF unit 129 in order.

In the broadcasting signal relay system 200, the result of the determination on the broadcasting signals remaining in the converting-unit located area is sent to the TCP/IP unit 126 via the channel determining section 204. Upon reception of the determination result, the TCP/IP unit 126 sends a request signal to the wireless data packet converting unit 113. The request signal describes the result of the determination on the broadcasting signals remaining in the area where the wireless data packet inverse converting unit 114 is located.

Although the determination on the broadcasting signals remaining in the converting-unit located area is executed in the corresponding base station and the determination result is transmitted as a request signal to the wireless data packet converting unit 113, the determination on the broadcasting signals remaining in the converting-unit located area may be handled as an internal process of the wireless data packet converting unit 113. In this case, the radio signal that the converting-unit located area actually demands can be requested by notifying the radio reception conditions of the converting-unit located area to the wireless data packet converting unit 113 via the IP network or the like, no matter how intermittent the transmission is, by means similar to the method of monitoring radio signals as disclosed in the foregoing descriptions of FIGS. 13 and 14.

The wireless data packet converting unit 113 selects the bandwidth of the broadcasting signal to be transformed into an IP packet based on the transmitted request signal. When the request signal describes that an AM broadcasting signal remains in the area where the wireless data packet inverse converting unit 114 is located, as shown in FIG. 18, only the FM broadcasting signal and the terrestrial broadcasting signal are transformed into IP packets which are transmitted to the wireless data packet inverse converting unit 114 via the transfer medium 201. The wireless data packet inverse converting unit 114 transmits the packet data comprised of the FM broadcasting signal and terrestrial broadcasting signal after it is subjected to the TCP/IP process, buffering, DA conversion, etc.

As described above, the broadcasting signal relay system 200 to which the present invention is adapted can realize the real-time response to a change in the frequency environment in the converting-unit located area. Particularly, the broadcasting signal relay system 200 can select necessary broadcasting signals in the wireless data packet converting unit 113 and transmit the broadcasting signals, thus reducing the transfer amount of packet data in the transfer medium 201. When a fast response to a change in the frequency environment in the area where the wireless data packet inverse converting unit 114 is located is not obtained, the transfer amount of packet data can be reduced, thereby improving the overall system efficiency.

INDUSTRIAL APPLICABILITY

According to the wireless communication system and method embodying the present invention, as described above, signals to be transmitted and received in a communication path are structured in such a way that analog information representing changes in the same amplitude, frequency and phase of a radio signal is directly AD-converted and packetized. That is, in the present invention, a base station which directly transmits and receives a radio signal to and from a communication terminal relays the radio signal without modulation or demodulation of the radio signal as done in the case of using the ROF technique. This eliminates the need to replace the system configuration of the base station even if the service or the specification is changed, thus improving the flexibility of the overall system.

In the wireless communication system to which the present invention is adapted, an optical signal to be transmitted and received is converted to a digital signal before being packetized into packet data. Unlike the conventional system, the wireless communication system of the present invention eliminates the need to use the analog modulation system in the optical modulation. In addition, unlike the conventional system, the present system which transmits and receives an optical signal as a digital signal does not need to take some advanced measure against the influence of the non-linearity of the optical device or the influence of the dispersion of the optical fibers. Because the present invention uses digital modulation in the optical modulation system and uses a frame format which compatible with an IP network, the system may be configured with fast and low-cost digital optical circuits and replacement within the IP network can be handled in the same way as done for other ordinary packets.

What is claimed is:

1. A wireless communication system for executing transmission and reception of a radio signal among communication terminals via a plurality of base stations connected to a cable network, comprising
 a first of the base stations that performs an AD conversion on a radio signal received via an antenna from one of the communication terminals without demodulation, packetizes the AD-converted radio signal into packet data, and transmits the packet data over the cable network to a second of the base stations that performs DA conversion on the packet data received over the cable network from the first base station, transforms the DA-converted packet data into a radio signal without modulation, and transmits the radio signal to another communication terminal via the antenna,
 an I channel signal and a Q channel signal both being extracted from the radio signal received via the antenna on a same time axis over a plurality of sampling periods, and being subjected to the AD conversion without demodulation, and at a time of packetizing the I channel signal and the Q channel signal, sampled values of an I channel and sampled values of a Q channel being alternately arranged in a time sequential order.

2. The wireless communication system according to claim 1, wherein each of the base stations performs a frame process on the AD-converted data based on an ETHERNET protocol to execute the packetization.

3. The wireless communication system according to claim 1, wherein a bit sequence representing a wireless communication signal is inserted in a header portion at a timing of the packetization of the AD-converted radio signal.

4. The wireless communication system according to claim 3, further comprising a switch device connected to the cable network and configured to switch outputting of the data to at least the base stations, wherein when identifying that it is a wireless communication based on the bit sequence inserted in the packet data to be transmitted over the cable network, the switch device performs the DA conversion on the packet data, and outputs the DA-converted packet data without modulation.

5. The wireless communication system according to claim 1, wherein communication among the communication terminals is carried out in a peer-to-peer (P2P) communication mode via the plurality of base stations connected to the cable network.

6. The wireless communication system according to claim 5, further comprising a control section, connected to the cable network, for controlling communication among the communication terminals, wherein each of the base stations acquires a destination address of the control section beforehand, and, at a time of starting the P2P communication, the each base station first accesses the control section to establish communication connection among the communication terminals via the control section, the control section notifies an address of at least one of a communication terminal and an address of a base station to which the communication terminal belongs to the communication terminal to be at least one of a communication party and the base station to which the communication terminal belongs, and communication among the communication terminals is then carried out via the communication connection based on each address notified.

7. The wireless communication system according to claim 5, wherein the control section notifies the base station of information on a shortest transmission path for the packet data to be transmitted/received among the communication terminals which communicate with one another in the P2P communication mode.

8. A base station configured for the wireless communication system according to claim 1, comprising:
 the antenna for transmitting and receiving the radio signal to and from the communication terminals;
 AD conversion means that performs the AD conversion on a radio signal received via the antenna without demodulation, yielding a digital signal;
 packet conversion means that packetizes the AD-converted digital signal into the packet data, and transmits the packet data to the cable network;
 reverse packet conversion means that removes various headers of the packet data received over the cable network to be converted into a sequential digital signal; and
 transmission means that transforms the sequential digital signal into a radio signal without modulation, and transmits the radio signal to the communication terminals.

9. A switch device configured for the wireless communication system according to claim 3, comprising:
 switch means that switches outputting of data based on a bit sequence inserted in the packet data to be transmitted over the cable network.

10. A wireless communication method for executing transmission and reception of a radio signal among communication terminals via a plurality of base stations connected to a cable network, comprising
 a first of the base stations that performs an AD conversion on a radio signal received via an antenna from one of the communication terminals without demodulation, packetizes the AD-converted radio signal into packet data, and transmits the packet data over the cable network to a second of the base stations that performs DA conversion on the packet data received over the cable network from the first base station, transforms the DA-converted packet data into a radio signal without modulation, and transmits the radio signal to another base station via the antenna,
 an I channel signal and a Q channel signal both being extracted from the radio signal received via the antenna on a same time axis over a plurality of sampling periods, and being subjected to the AD conversion without demodulation, and at a time of packetizing the I channel signal and the Q channel signal, sampled values of an I channel and sampled values of a Q channel being alternately arranged in a time sequential order.

* * * * *